US011755416B2

(12) United States Patent
Borate et al.

(10) Patent No.: US 11,755,416 B2
(45) Date of Patent: Sep. 12, 2023

(54) STORAGE TIERING FOR BACKUP DATA

(71) Applicant: Druva Inc., Santa Clara, CA (US)

(72) Inventors: Milind Borate, Pune (IN); Somesh Jain, Pune (IN); Pallavi Thakur, Pune (IN); Anand Apte, Pune (IN)

(73) Assignee: Druva Inc., Santa Clara, CA (US)

( * ) Notice: Subject to any disclaimer, the term of this patent is extended or adjusted under 35 U.S.C. 154(b) by 0 days.

(21) Appl. No.: 17/145,147

(22) Filed: Jan. 8, 2021

(65) Prior Publication Data
US 2021/0216407 A1    Jul. 15, 2021

(30) Foreign Application Priority Data

Jan. 14, 2020  (IN) .............................. 202041001695
Nov. 27, 2020  (IN) .............................. 202041051738

(51) Int. Cl.
*G06F 11/14* (2006.01)
(52) U.S. Cl.
CPC ................................ *G06F 11/1448* (2013.01)
(58) Field of Classification Search
CPC ............. G06F 11/1448; G06F 11/1453; G06F 11/1469; G06F 2201/84
USPC ........................................................ 707/654
See application file for complete search history.

(56) References Cited

U.S. PATENT DOCUMENTS

| 7,296,125 | B2* | 11/2007 | Ohran | G06F 11/1451 |
| | | | | 714/E11.123 |
| 8,315,995 | B1* | 11/2012 | Levy | G06F 3/0608 |
| | | | | 707/694 |
| 8,566,483 | B1* | 10/2013 | Chen | G06F 3/0689 |
| | | | | 710/18 |
| 8,799,595 | B1* | 8/2014 | Chatterjee | G06F 11/1456 |
| | | | | 711/162 |
| 9,912,752 | B1* | 3/2018 | Davis | G06F 16/2365 |
| 10,031,703 | B1* | 7/2018 | Natanzon | G06F 3/0647 |
| 2010/0198791 | A1* | 8/2010 | Wu | G06F 11/1451 |
| | | | | 707/E17.007 |
| 2014/0359051 | A1* | 12/2014 | Dart | H04L 67/1097 |
| | | | | 709/216 |
| 2016/0150047 | A1* | 5/2016 | O'Hare | G06F 11/1469 |
| | | | | 713/168 |

(Continued)

FOREIGN PATENT DOCUMENTS

| EP | 1830270 A1 * | 9/2007 | .......... G06F 11/1451 |
| JP | 2000174089 * | 9/2005 | .............. Y02P 90/02 |

*Primary Examiner* — Grace Park
*Assistant Examiner* — Abdullah A Daud
(74) *Attorney, Agent, or Firm* — Fenwick & West LLP

(57) ABSTRACT

A backup management system may include a data management server, a warm-tier data store, and a cold-tier data store. Snapshots may be captured from various client devices. A data block stored in the warm-tier data store may be referenced by multiple backup snapshots and/or referenced by one or more users. When a data block's total reference count is equal to the cold reference count or equal to or less than a threshold total reference count, the data management server may determine that the data block is ready to be migrated to the cold-tier data store. The data management server may send the data block into a candidate queue. In the queue, data blocks with similar retention periods or similar expected restoration may be grouped as a unit. The unit may be transmitted to the cold-tier data store in a single write request.

22 Claims, 10 Drawing Sheets

(56) References Cited

U.S. PATENT DOCUMENTS

2019/0034092 A1\* 1/2019 DeKoning .............. G06F 3/067
2019/0073275 A1\* 3/2019 Sarafijanovic ........ G06F 3/0685

\* cited by examiner

STORAGE TIERING FOR BACKUP DATA

CROSS REFERENCE TO RELATED APPLICATIONS

This application claims priority to Indian Provisional Application No. 202041001695, filed Jan. 14, 2020 and Indian Provisional Application No. 202041051738, filed Nov. 27, 2020, both of which are incorporated herein in their entirety for all purposes.

TECHNICAL FIELD

The disclosed embodiments are related to backup management systems, and, more specifically, to data management servers that may divide data into different storage tiers.

BACKGROUND

To protect against data loss, organizations may periodically backup data to a backup system. In some cases, the backup system may need to deal with various retention and restoration policies among various organizations and even within an organization. For example, on one hand, certain critical data related to operations of the organization may have a very stringent retention and restoration policies that mandate the data be restored within a very short period of time in case of data loss or device failure. On the other hand, backup data may also include routine files that may be duplicate among various users in an organization. Among different organizations, the same type of data may also have very different data retention policies that are individually set by the organizations.

Figure 1:
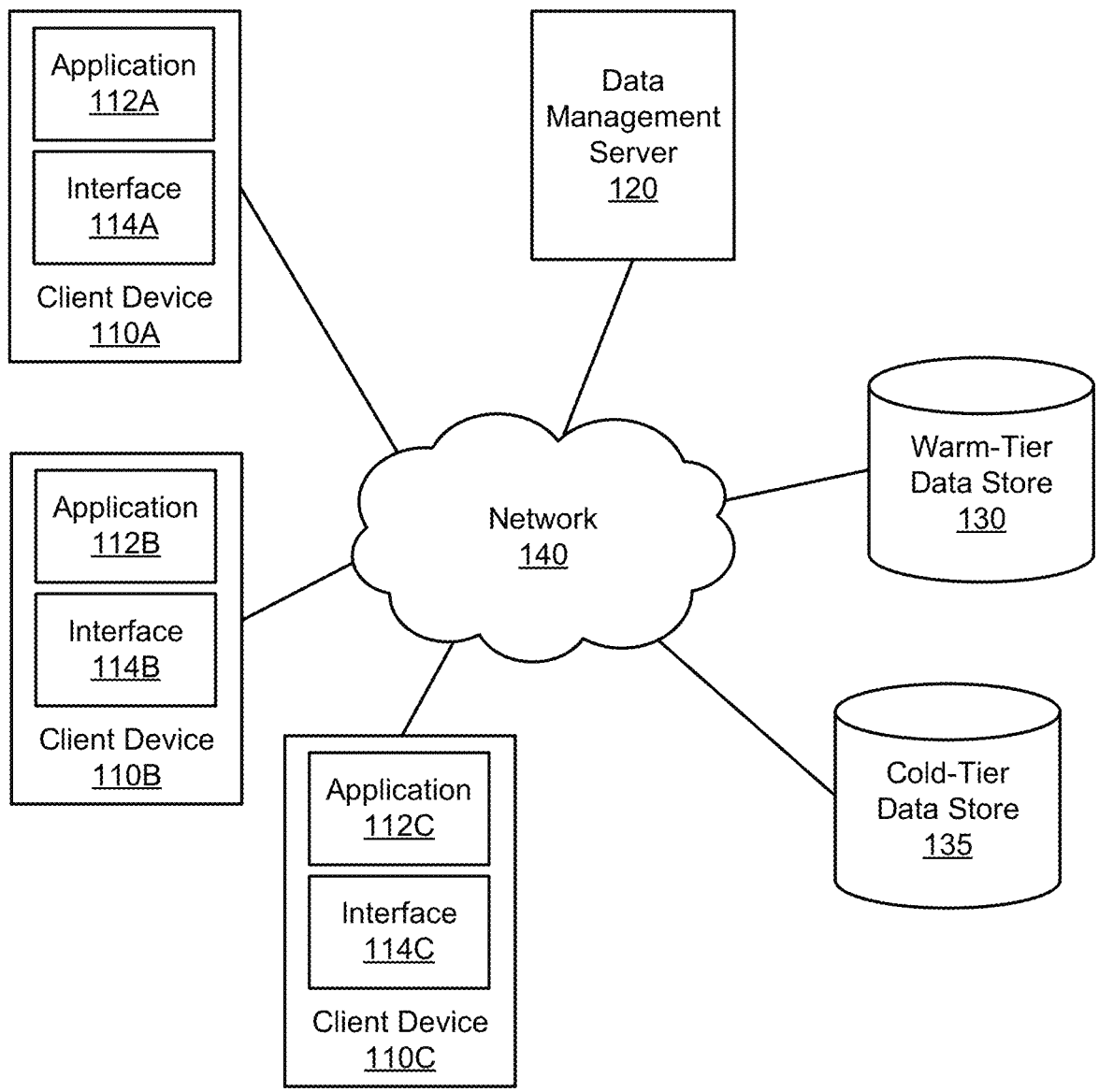
FIG. 1 is a block diagram illustrating an environment of an example backup management system, in accordance with an embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

The figures (FIGs.) and the following description relate to preferred embodiments by way of illustration only. One of skill in the art may recognize alternative embodiments of the structures and methods disclosed herein as viable alternatives that may be employed without departing from the principles of what is disclosed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Disclosed are example embodiments related to systems and processes of data management servers that improve the efficiency and cost of operating backup systems. In a backup management system, backup snapshots from many different client devices may periodically be captured and sent to data stores for storage. Multiple snapshots, whether captured from the same client device, may include data blocks that remain unchanged across multiple backup operations corresponding to the snapshots. To reduce the storage space occupied by the data, the data management server may perform a deduplication process to remove duplicated data blocks in a data store. Hence, a data block may be referenced by multiple related or unrelated snapshots.

In accordance with an embodiment, to further improve the storage efficiency in a backup management system, the data management server may divide data and snapshots into two or more tiers. For example, snapshots may be divided into warm snapshots and cold snapshots. Warm snapshots may be recently captured snapshots that are expected to be more active compared to older and inactive cold snapshots. Accordingly, data blocks stored in data stores may also be divided as warm data blocks and cold data blocks. Warm data blocks may be data blocks that are referenced by one or more warm snapshots, while cold data blocks may be data blocks that are no longer referenced by a warm snapshot.

By dividing data into two or more tiers, the backup management system may implement multiple tiers of data stores. For example, in one embodiment, a backup management system may include a warm-tier data store and a cold-tier data store. The cold-tier data store may use devices and data structure that have a lower long-term storage cost but may have longer data retrieval latency and data restoration time. In contrast, the warm-tier data store may have much faster data restoration time to allow active backup data blocks to be quickly restored. Data blocks that are expected to be less active, such as the cold data blocks, may be migrated to the cold-tier data store for long term storage.

In one embodiment, the data management server may use a cost-effective process in migrating the data blocks from a warm-tier data store to a cold-tier data store. The data management server may determine that one or more originally warm snapshots have transitioned to one or more cold snapshots. The data management server may identify that some of the data blocks stored in the warm-tier data store are ready to be transferred to the cold-tier data store due to the originally warm snapshots that reference those data blocks having transitioned to cold snapshots. For example, the data management server may determine a snapshot-based total reference count and a cold reference count of a data block. When a data block's total reference count is equal to the cold reference count, the data management server may determine that the data block is not referenced by any warm snapshot and is ready to be migrated to the cold-tier data store. The data management server may send the data block into a candidate queue. In the queue, data blocks with similar retention periods may be grouped as a unit. The unit may be transmitted to the cold-tier data store in a single write request.

In another embodiment, the data management server may use a different cost-effective process in migrating the data blocks from a warm-tier data store to a cold-tier data store. The data management server may identify that a subset of the data blocks stored in the warm-tier data store have been stored in the warm-tier data store for a predefined amount of time. For example, the subset of data blocks may be part of warm snapshots that have transitioned to one or more cold snapshots after the predefined amount of time. Each data block in the subset may be checked to determine a back reference-based total reference count (e.g., how many users and/or client devices reference a particular data block). Depending on the number of users and/or client devices that reference a data block, the data management server may send the data block into the candidate queue. In the queue, data blocks with similar expected restoration(s) may be grouped as a unit. The unit may be transmitted to the cold-tier data store in a single write request.

Grouping multiple data blocks as a unit may reduce the cost incurred in writing the data into the cold-tier data store. Grouping the data blocks with similar retention periods or similar expected restoration may reduce the storage cost of the data.

Example System Environment

Referring now to FIG. (FIG. 1, a block diagram that illustrates an environment of an example backup management system 100 is shown, in accordance with an embodiment. In some embodiments, a backup management system 100 may be a deduplicated data management system that will be further discussed with reference to FIG. 2. By way of example, the backup management system 100 may include one or more client devices, e.g., 110A, 110B, 110C, etc. (collectively referred to as client devices 110 or a client device 110), one or more data management servers 120, one or more warm-tier data stores 130, and one or more cold-tier data stores 135. In various embodiments, the backup management system 100 may include fewer and additional components that are not shown in FIG. 1.

The various components in the backup management system 100 may each correspond to a separate and independent entity or some of the components may be controlled by the same entity. For example, in one embodiment, the data management server 120 and one or more data stores 130 and 135 may be controlled and operated by the same data storage provider company while each client device 110 may be controlled by an individual client. In another embodiment, the data management server 120 and the data stores 130 and 135 may be controlled by separate entities. For example, the data management server 120 may be an entity that utilizes various popular cloud data service providers as data stores 130 and 135. The components in the backup management system 100 may communicate through the network 140. In some cases, some of the components in the environment 100 may also be communicated through local connections. For example, the server 120 and the data store 130 may be communicated locally.

A client device 110 may be a computing device that can transmit and/or receive data via the network 140. Users may use the client device to perform functions such as accessing, storing, creating, and modifying files, accessing digital content, and executing software applications. A client device 110 may send a request to store, read, search, delete, and/or modify data stored in one or more data stores 130 and 135. Data of a client device 110 may be captured as one or more snapshots of the client device 110 and be stored in one or more data stores 130 and 135. The client also may be referred to as a user or an end user of the data management server 120. The client device 110 also may be referred to as a user device or an end user device. Each client device 110 may include one or more applications 112 (individually referred to as 112A, 112B, 112C, etc., and collectively referred to as applications 112 or an application 112) and one or more user interfaces 114 (individually referred to as 114A, 114B, 114C, etc., and collectively referred to as user interfaces 114 or a user interface 114). The client devices 110 may be any computing devices. Examples of such client devices 110 include personal computers (PC), desktop computers, laptop computers, tablets (e.g., iPADs), smartphones, wearable electronic devices such as smartwatches, or any other suitable electronic devices. The clients may be of different natures such as including individual end users, organizations, businesses, and other clients that use different types of client devices that run on different operating systems.

The applications 112 may be any suitable software applications that operate at the client devices 110. The applications 112 may be of different types. In one case, an application 112 may be a web application that runs on JavaScript or other alternatives, such as TypeScript, etc. In the case of a web application, the application 112 cooperates with a web browser to render a front-end user interface 114. In another case, an application 112 may be a mobile application. For example, the mobile application may run on Swift for iOS and other APPLE operating systems or on Java or another suitable language for ANDROID systems. In yet another case, an application 112 may be a software program that operates on a desktop computer that runs on an operating system such as LINUX, MICROSOFT WINDOWS, MAC OS, or CHROME OS.

In one embodiment, an example application 112 may be provided and controlled by the data management server 120. For example, the company operating the data management server 120 may be a data storage service provider that provides a front-end software application that can be installed, run, or displayed at a client device 110. The application 112 provided by the data management server 120 may automatically perform or allow the user to perform various data management tasks such as capturing one or more snapshots of a device, scheduling capturing of snapshots, facilitating manual backup, uploading, downloading of files, and other data management and backup tasks. The applications 112 provided by the data management server 120 may take various forms such as software as a service (SaaS), downloadable applications, free applications, etc. In one case, an example application 112 may be installed at a client device 110 as a background application that performs periodic backup operations and provides additional task options when its user interface 114 is launched. In another case, an application 112 is published and made available by the company operating the data management server 120 at an application store (App store) of a mobile operating system. In yet another case, an end user may go to the company's website and launch a web application for various data management tasks such as backup or snapshot management.

The user interfaces 114 may be any suitable interfaces for receiving inputs from users and for communication with users. When a client device 110 attempts to performs a data management task, the user may communicate to the application 112 and the data management server 120 through the user interface 114. The user interface 114 may take different forms. In one embodiment, the user interface 114 may be a web browser such as CHROME, FIREFOX, SAFARI, INTERNET EXPLORER, EDGE, etc. and the application 112 may be a web application that is run by the web browser. In another application, the user interface 114 is part of the application 112. For example, the user interface 114 may be the front-end component of a mobile application or a desktop application. The user interface 114 also may be referred to as a graphical user interface (GUI) which includes graphical elements to display files such as spreadsheets. In another embodiment, the user interface 114 may not include graphical elements but may communicate with the data management server 120 via other suitable ways such as application program interfaces (APIs).

A data management server 120 may include one or more computing devices that manage data of client devices 110 that are stored in one or more data stores 130 and 135. In this disclosure, data management servers 120 may collectively and singularly be referred to as a data management server 120, even though the data management server 120 may include more than one computing device. For example, the data management server 120 may be a pool of computing devices that may be located at the same geographical location (e.g., a server room) or distributed geographically (e.g., cloud computing, distributed computing, or in a virtual server network). A computing device of the data management server 120 may take the form of software, hardware, or a combination thereof (e.g., some or all of the components of a computing machine of FIG. 10). For example, parts of the data management server 120 may be a PC, a tablet PC, a smartphone, an internet of things (IoT) appliance, or any machine capable of executing instructions that specify actions to be taken by that machine. Parts of the server 120 may include one or more processing units (e.g., a central processing unit (CPU), a graphics processing unit (GPU), a digital signal processor (DSP), a controller, a state machine, one or more ASICs, one or more RFICs, or any combination of these) and a memory.

The warm-tier data store 130 and the cold-tier data store 135 (collectively may be simply referred to as data stores 130 and 135) may include one or more storage units such as memory that may take the form of non-transitory and non-volatile computer storage medium to store various data. In some cases, one or more data stores 130 and 135 may communicate with other components by the network 140. Those data stores 130 and 135 may also be referred to as cloud storage servers. Example cloud storage service providers may include AMAZON AWS, DROPBOX, RACKSPACE CLOUD FILES, AZURE BLOB STORAGE, GOOGLE CLOUD STORAGE, etc. In other cases, instead of cloud storage servers, one or more data stores 130 and 135 may be storage devices that are controlled and connected to the data management server 120. For example, those data stores 130 and 135 may be memory (e.g., hard drives, flash memory, discs, tapes, etc.) used by the data management server 120.

A data store 130 or 135 may be a distributed system that distributes data among different nodes to provide better data access and operation in case of a failure or offline of one or more nodes. In one embodiment, such a data store may be a NoSQL database server. The data store may be used for data deduplication purposes. Fingerprints of data may be created as the deduplication indices of the data. For more details about how a data store may operate as a distributed system with the deduplication indices, U.S. Pat. No. 8,996,467, patented on Mar. 31, 2015, entitled "Distributed Scalable De-Duplicated Backup Management System" is incorporated herein by reference for all purposes.

Various data stores 130 and 135 may use different data storage architectures to manage and arrange the data. For example, in some cases, one or more data stores may manage data as a file hierarchy or with sectors and tracks. In some embodiment, one or more data stores 130 and 135 may take the form of an object storage system, such as AMAZON S3 and AMAZON GLACIER. Object storage (also known as object-based storage) may be a computer data storage architecture that manages data as objects, as opposed to other storage architectures like file storage which manages data as a file hierarchy. Each object may typically include the data of the object itself, a variable amount of metadata of the object, and a unique identifier that identifies the object. The unique identifier may take the form of a fingerprint (e.g., checksum) of the underlying data of the object itself. Even if only a small number of bits are changed in the underlying data, the fingerprint could be changed significantly. In some implementations of objects, once an object is created, normally it could be difficult to be changed even for a single bit. However, unlike files that often need an operating system of a computer to be accessed, objects may often be accessed directly from a data store and/or through API calls. This allows object storage to scale efficiently in light of various challenges in storing big data.

Between the warm-tier data store 130 and the cold-tier data store 135, there may be different requirements, natures, system structures, and storage architecture. A warm-tier data store 130 usually stores "warm" data, which may be referring to data that is expected to be more frequently accessed or retrieved from client devices 110, such as backup snapshots that are recent and files that are active. A cold-tier data store 135 usually stores "cold" data, which may be referring to data that is expected to be inactive or less frequently accessed or retrieved from client devices 110, such as old backup snapshots and inactive files. Older backup copies may be retained as cold data for compliance, analytics, legal, or forensic purposes. For example, in an embodiment, cold tier data store 135 may store data that has not been accessed or used for a long term period of time that may be predefined, e.g., one year or more. Warm store data store 130 may store data that has been accessed regularly in a time period less than the predefined long term period.

Restoration of warm data may be associated with more stringent recovery time objective (RTO) requirements, which may require a data management system to restore the data to a client device 110 within hours or even minutes. The use of cold data usually has more relaxed RTO requirements, which may allow longer data retrieval latency such as in hours or even days.

Whether a certain block of data or a certain snapshot is considered as warm or cold may sometimes be set by the system administrator or operator of a client device 110 or the data management server 120. Various system administrators of client devices 110 may have different warm/cold data policies and standards. Active backup data may be an example of warm data while archival data may be an example of cold data. The data management server 120 may manage the migration of data from a warm-tier data store 130 to a cold-tier data store 135 when the data turns from warm to cold. Depending on implementations, the objective definitions on how data are classified as warm or cold may vary. For example, backup copies of data may be categorized as warm data up to a certain short period of time (e.g., days or weeks). Additionally, or alternatively, data may also be categorized as warm data or cold data based on the frequency of use, types of files, and other metrics. Data may also be categorized based on various migration criteria discussed in further detail with reference to FIGS. 3B and 3C.

The warm-tier data store 130 and the cold-tier data store 135 may also have different costs in terms of storage, read, and write requests. For example, in one embodiment, a warm-tier data store 130 may have lower read and write costs than a cold-tier data store 135 to allow frequent access of data in the warm-tier data store 130. In contrast, a cold-tier data store 135 may have a lower storage cost than the warm-tier data store 130 to allow long term storage of cold data in the cold-tier data store 135. Costs may be direct monetary costs to be spent to perform an action in the data store (e.g., read, write, store) or other costs such as computer resources and time in performing an action.

The warm-tier data store 130 and the cold-tier data store 135 may take different forms. They may also be referred to respectively as a first data store 130 and a second data store 135, or respectively as a backup data store 130 and an archive data store 135. In a first example, both data stores 130 and 135 are cloud data servers that are designed for different purposes. In one example embodiment, the warm-tier data store 130 may be AMAZON S3 and the cold-tier data store 135 may be AMAZON GLACIER, which may be tailored for longer term storage compared to AMAZON S3. In a second example, the warm-tier data store 130 may include faster storage units such as cloud data servers, hard drives, flash memories while the cold-tier data store 135 may include cheaper long-term storage units such as on-premises tape backup drives. In a third example, the warm-tier data store 130 and the cold-tier data store 135 may belong to the same storage system. The data management server 120 may simply designate a certain part of the storage system as warm-tier data store 130 and another part of the storage system as cold-tier data store 135. Other suitable combinations of different natures and architectures are also possible for the data stores 130 and 135.

The communications among the client devices 110, the data management server 120, and the data stores 130 and 135 may be transmitted via a network 140, for example, via the Internet. The network 140 provides connections to the components of the system 100 through one or more subnetworks, which may include any combination of local area and/or wide area networks, using both wired and/or wireless communication systems. In one embodiment, a network 140 uses standard communications technologies and/or protocols. For example, a network 140 may include communication links using technologies such as Ethernet, 802.11, worldwide interoperability for microwave access (WiMAX), 3G, 4G, Long Term Evolution (LTE), 5G, code division multiple access (CDMA), digital subscriber line (DSL), etc. Examples of network protocols used for communicating via the network 140 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over a network 140 may be represented using any suitable format, such as hypertext markup language (HTML), extensible markup language (XML), or JSON. In some embodiments, all or some of the communication links of a network 140 may be encrypted using any suitable technique or techniques such as secure sockets layer (SSL), transport layer security (TLS), virtual private networks (VPNs), Internet Protocol security (IPsec), etc. The network 140 also includes links and packet switching networks such as the Internet.

Example Data Management Server Architecture

Figure 2:
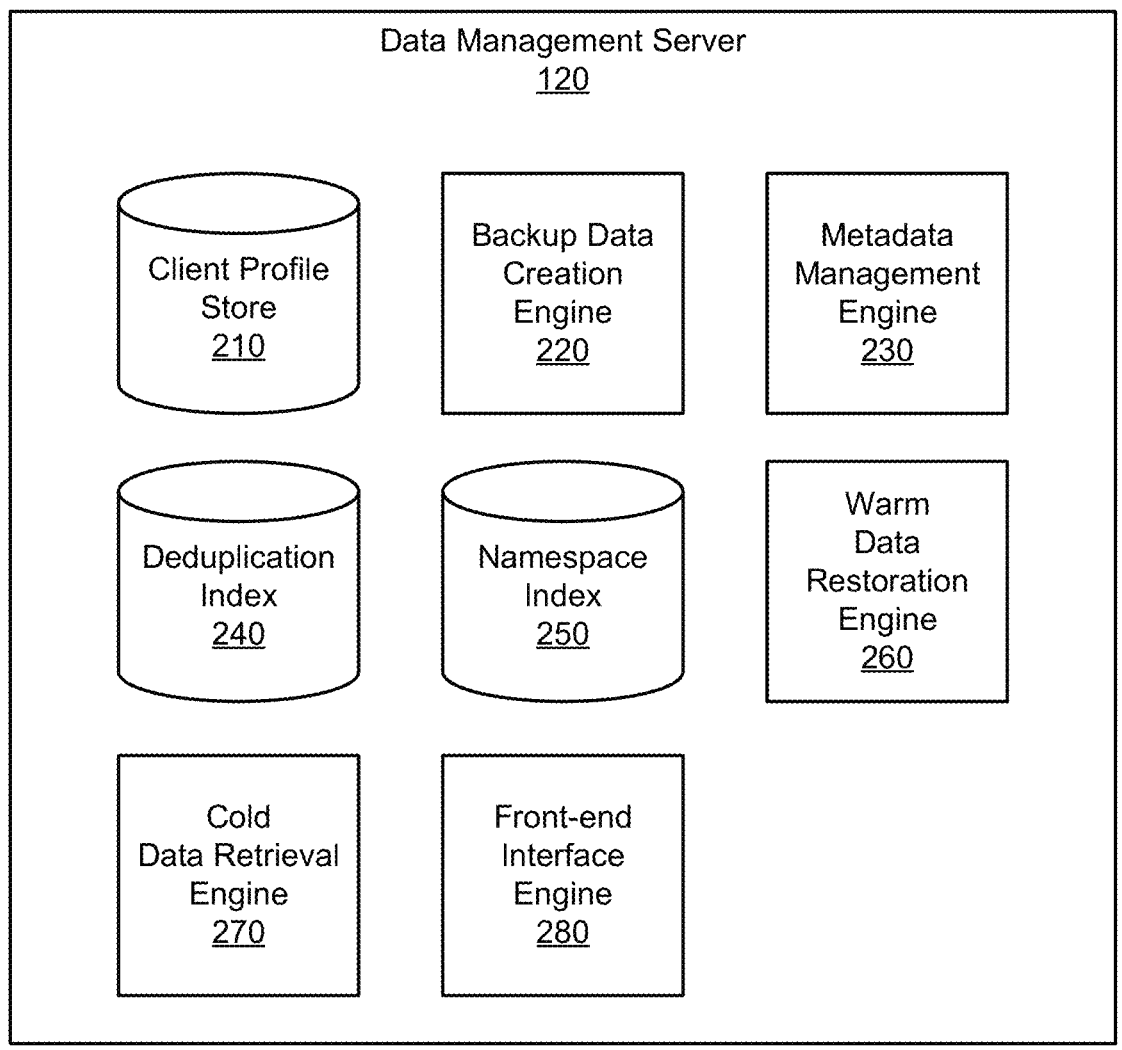
FIG. 2 is a block diagram illustrating the architecture of an example data management server, in accordance with an embodiment.
Figure 2:
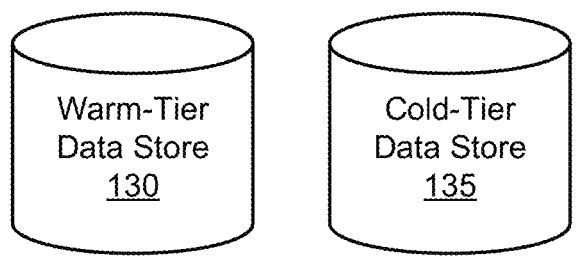

FIG. 2 is a block diagram illustrating an example data management server 120, in accordance with an embodiment. Components of the data management server 120 may be a combination of hardware and software and may include all or a subset of the example computing system illustrated and described with FIG. 10. The data management server 120 may include a client profile store 210, a backup data creation engine 220, a metadata management engine 230, a deduplication index 240, a namespace index 250, a warm data restoration engine 260, a cold data retrieval engine 270, and a front-end interface engine 280. In various embodiments, the data management server 120 may include fewer and additional components that are not shown in FIG. 2. For example, in some embodiments, the warm-tier data store 130 and the cold-tier data store 135 may be part of the data management server 120. In other embodiments, the data stores 130 and 135 may be operated by an independent party such as a cloud storage provider. The functions of the data management server 120 may be distributed among the components in a different manner than described. In some embodiments, the data management server 120 manages the data stored in various data stores 130 and 135 and performs deduplication of data to reduce the storage space occupied in the data stores 130 and 135. In some embodiments, the data management server 120 and one or more data stores 130 and/or 135 may form a time-indexed deduplicated storage system.

The example structure of the data management server shown in FIG. 2 is only an example of data management server 120. In different embodiments, other variations of data management servers 120 may also be used. For example, the data management server 120 in FIG. 2 is shown as a time-indexed deduplicated storage system. However, in other embodiments, the storage system does not always need to perform deduplication or one or more features described in association with FIG. 2.

The client profile store 210 stores information of clients, which may include log-in credentials (e.g., usernames, user identifications, etc.), profile information of clients, and information associated with client devices 110 (e.g., client device identifications, IP addresses, etc.) used by the clients.

Each log-in account may be associated with a client identifier that uniquely identifies a client. For example, the user account name (or a version of the user account name such as a hash of the user account) may be used as the unique client identifier of the client. The client identifier may be used to identify data to which the client has access. In the namespace index 250, data entries corresponding to the data to which the client has access may include the client identifier so that the data management server 120 can control the access of data in one or more data stores 130 and 135. In some embodiments, each client profile in the client profile store 210 may also store the index entry identifiers of data blocks to which the client has access.

The backup data creation engine 220 may create backups of data that are from the client devices 110 and upload the backup data to one or more data stores 130 and 135. A backup operation may be triggered by an action performed at a client device 110 or by an event, may be scheduled as a regular backup, or may be in response to an automated backup task initiated by the data management server 120 to a client device 110. In one embodiment, the backup data creation engine 220 may poll a client device 110 periodically and receive files to be backed up and corresponding metadata, such as file names, file sizes, access time-stamps, access control information, and the like. The backup data creation engine 220 may store the files of the client devices 110 as data blocks in the warm-tier data store 130 until the data blocks become cold data. In one embodiment, the backup data creation engine 220 may perform incremental backup operations that leverage data from previous backup cycles to reduce the amount of data to store in creating snapshots. For example, after an initial full data capture, subsequent snapshots may be differential data compared to the previous snapshots.

The backup data captured from a client device 110 may take the form of snapshots. A backup snapshot may be a set of copies of files that reflect the state of a client device 110 at the capture time. For example, a snapshot may be an image of the storage (or a portion of the storage) of a client device 110 that is captured at a particular moment in time. The moment in time may be referred to as a checkpoint. A snapshot may be a complete image or an incremental image. For example, an initial backup of a device may generate a snapshot that captures a complete image of a set of files in a client device 110. Subsequent checkpoints may generate snapshots of incremental images that represent the differential changes of the client device 110. The backup snapshot may additionally include metadata associated with the files, such as timestamps of changes, timestamps of access, ACL checksums, attribute checksums, and other like metadata. In some embodiment, a snapshot may represent a volume (e.g., a partition of a storage device) of the client device 110. However, in other embodiments, a snapshot may only represent a portion of the client device 110 (e.g., a particular directory, a particular folder, or even a single file). The extent of file coverage of a snapshot may depend on the backup settings of individual client devices 110 and may be different among various client devices 110.

In one embodiment, a snapshot may be divided as data blocks that are saved in various different locations in a data store 130 or 135. A data block may be a set of bits that represent data of a file or multiple files. Files may be of various sizes compared to a data block. For example, a large file may include multiple data blocks while a single data block may contain data of a combination of various small files. Data of a file may be retrieved by the identifiers of data blocks (e.g., data blocks' addresses, checksums, etc.) and offsets of the starting and ending data blocks. Various individual data blocks of a snapshot may be stored in different locations of a data store 130 or 135 and sometimes may not be grouped. For example, some of the data blocks may be duplicated data that have already been uploaded from other client devices 110. Those data blocks may not need to be saved again in a data store. In some data stores 130 or 135, a data block may be started in a random location based on the checksum or another identifiable fingerprint of the data block (or the object containing the data block) as the address or identifier of the data block. Some data stores 130 or 135 use files as units to save the data instead of dividing files as data blocks that are fixed length. Hence, in some embodiments, the term data block may be used interchangeably with the term file.

The metadata management engine 230 manages various metadata of files stored in various data stores 130 and 135. A backup file may include different metadata regarding the profile information of the file, the namespace data, deduplication data, and other data regarding data structure, file management, access control, permission, etc. Profile metadata may include title, creator, keywords, and other related information of the file. In a cloud data store, a file may be initially uploaded by a client and subsequently uploaded by other clients. Instead of saving duplicate copies of the same files, the data management server 120 may add metadata to the file originally uploaded to allow access of the file by additional users. Profile metadata may also include sender, recipients, subject line, copy list, dates, etc. in cases of file types such as emails. The metadata management engine 230 may save various metadata in a structured format (e.g., SQL) for users and administrators to conduct search and retrieval of accessible data. In some embodiments, various entries of metadata may take the form of key-value pairs. For example, identifiers of data blocks (e.g., fingerprints, file names, assigned identifiers, etc.) may serve as the keys while information such as data location, user identifiers, and namespace metadata may be the values of a particular key-value pair.

The deduplication index 240 may be a data store that includes one or more non-transitory computer readable storage media (e.g., memory) that store deduplication metadata of data blocks. A computer readable storage medium is a medium that does not include a transitory medium such as a propagating signal or a carrier wave. Deduplication index 240 stores deduplication metadata of various data blocks to identify copies of already saved files in a data store 130 or 135. When a client device 110 transmits a potentially new data block (e.g., a number of bits) to the data management server 120 to store at a data store, the data management server 120 may generate or receive the fingerprint of the data block. The fingerprint may be stored in the deduplication index 240. A fingerprint may represent a unique summary of the data block, which may sometimes be referred to as a message digest of the data block. The fingerprint may be derived by a checksum algorithm, a hash algorithm, or a fingerprint algorithm, depending on embodiments. For example, the algorithm may be a secure hash algorithm (SHA) or a message digest algorithm (MD). In one case, the fingerprint is a checksum of the data block. Based on the fingerprint, the server 120 examines the deduplication index 240 to determine whether the fingerprint is referenced in the deduplication index 240. For example, a fingerprint is referenced in the deduplication index 240 when the server 120 is able to locate an index entry that includes or is associated with the fingerprint. Other ways to reference the fingerprint in the deduplication index 240 is also possible. If the same data block has already been stored in a data store 130 or 135, instead of adding the same data block to the data store 130 or 135 twice, the data management server 120 might add an association between of the client and the index entry so that the deduplication index 240 has a record that the client is associated with the data block. In some embodiments, a data store may be an object storage system. The fingerprint of the data block may be used directly as the identifier and the address in an index entry to uniquely identify the data block.

The deduplication index 240 may also store data related to the status of a data block in various snapshots. For example, the deduplication index 240 may maintain a total reference count that calculates the total number of snapshots that reference the data block. In another example, the deduplication index 240 may maintain a total reference count that calculates the total number of users and/or client devices 110 that reference the data block. Other namespace metadata may include cold reference count, warm reference count, and retention timestamp, which will be discussed in further detail with reference to FIGS. 3A-3C.

The namespace index 250 may be another data store that includes one or more non-transitory computer readable storage media that store namespace metadata of data blocks of files. Namespace metadata of a file may include file version, filename, file location, data block identifiers, creation version, deletion version, modification time, size, etc. Each file may include catalog entries that identify the creation, modification, and deletion of the file with respect to various snapshots. For example, a first catalog entry may refer to a first snapshot of a particular client device 110 as the creation of the file. A second catalog entry may refer to a second snapshot that captured a modification of the file in the particular client device 110 and may include information regarding the precise data block that is modified. A third catalog entry may refer to a third snapshot that captured a deletion of the file the particular client device 110. A file deleted in a client device 110 may continue to exist in other client devices 110. Additional catalog entries may include the information reflecting the reference to the snapshots of other client devices 110.

A data block may also include namespace metadata specifically related to data deduplication and migration between a warm-tier data store 130 and a cold-tier data store 135. For example, in a deduplication data storage system, a common data block may be included in various snapshots of different client devices 110 that are unrelated. The data management system 120 may save the namespace metadata in the namespace index 250 and use the metadata to determine whether a data block is ready to be migrated from a warm-tier data store 130 to a cold-tier data store 135 and to determine whether a data block is ready to be deleted.

The warm data restoration engine 260 may provide restoration of data stored in the warm-tier data store 130 to a client device 110. The warm data restoration engine 260 may transmit backup snapshots or individual files to a client device 110 when a client is restoring one or more files in case of events such as data loss, computer crash, version controls, or other data restoration events. In response to a request by a client to restore a file or to go back to a particular snapshot, the warm data restoration engine 260 may locate the relevant metadata and access the warm-tier data store 130 to identify data blocks that need to be restored based on the metadata. Each client device 110 may be associated with different restoration requirements (e.g., RTO requirements) and protocols. The warm data restoration engine 260 may restore the data for a client device 110 based on the requirements and protocols.

The cold data retrieval engine 270 may retrieve data stored in the cold-tier data store 135 and provide the retrieved data to a client device 110. The procedures of data retrieval of a cold-tier data store 135 may be similar to that of the warm-tier data store 130 or may be different. For example, in one embodiment, both the warm-tier data store 130 and the cold-tier data store 135 are cloud storage servers. In such a case, the cold data retrieval engine 270 may provide a request via the network 140 to retrieve the data block. Yet, in other embodiments, the cold-tier data store 135 may have a structure that is different from the warm-tier data store 130. For example, the cold-tier data store 135 may use offsite physical storage devices such as hard drives, discs, or tapes to store the data. The cold data retrieval engine 270 may provide specific instructions to the cold-tier data store 135 to retrieve a particular data block. The data retrieval latency of the cold-tier data store 135 may be higher than that of the warm-tier data store 130 for this or other reasons.

The front-end interface engine 280 may manage and operate front-end interfaces for clients to manage their files and snapshots. For example, the front-end interface engine 280 may provide a web user interface. When a client visits and logs on to the website of the data management server 120, the front-end interface engine 280 may cause the client device 110 to display a web user interface at the web browser of the client device 110. The front-end interface engine 280 may control the content and information displayed on the website. The front-end interface engine 280 may display files stored in the data stores 130 and 135 in the forms of graphical elements in the web user interface. In another example, the front-end interface engine 280 may communicate with and control a user interface of an application that runs at the client device 110 to control the content and information of the application. The company operating the data management server 120 may publish the application that is installed at the client device 110. The client may manage files through the user interface of the application. In yet another example, the front-end interface engine 280 may maintain an interface in the form of an application program interface (API) for the client devices 110 to communicate with the server 120. The front-end interface engine 280 may also provide customer support services, such as authentication management and maintaining of client preferences.

The various engines and components shown in FIG. 2 may be a combination of hardware and software that includes instructions, when executed by hardware components such as one or more processors, to perform the functionality. Each engine may include all or a subset of the example computing system illustrated and described with FIG. 10.

Example Data Block Management and Migration

Figure 3A:
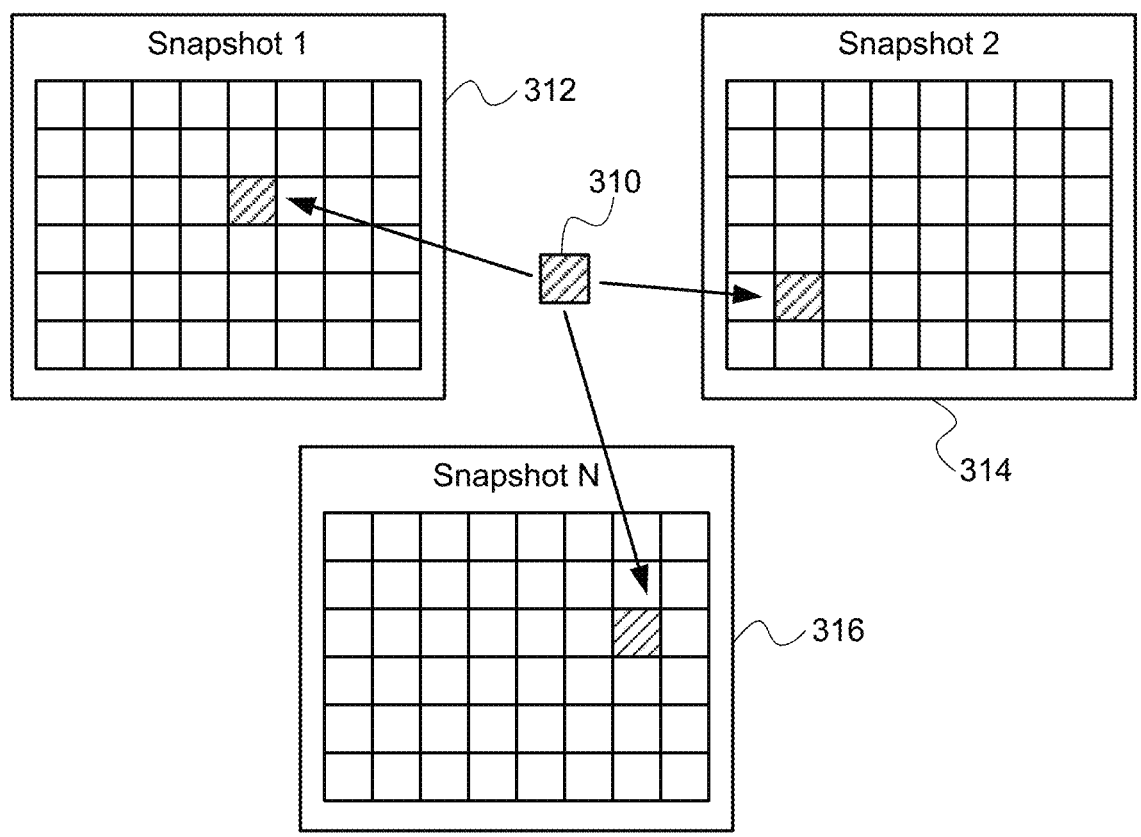
FIG. 3A is a conceptual diagram that illustrates the relationship between snapshots and data blocks, in accordance with an embodiment.
Figure 3B:
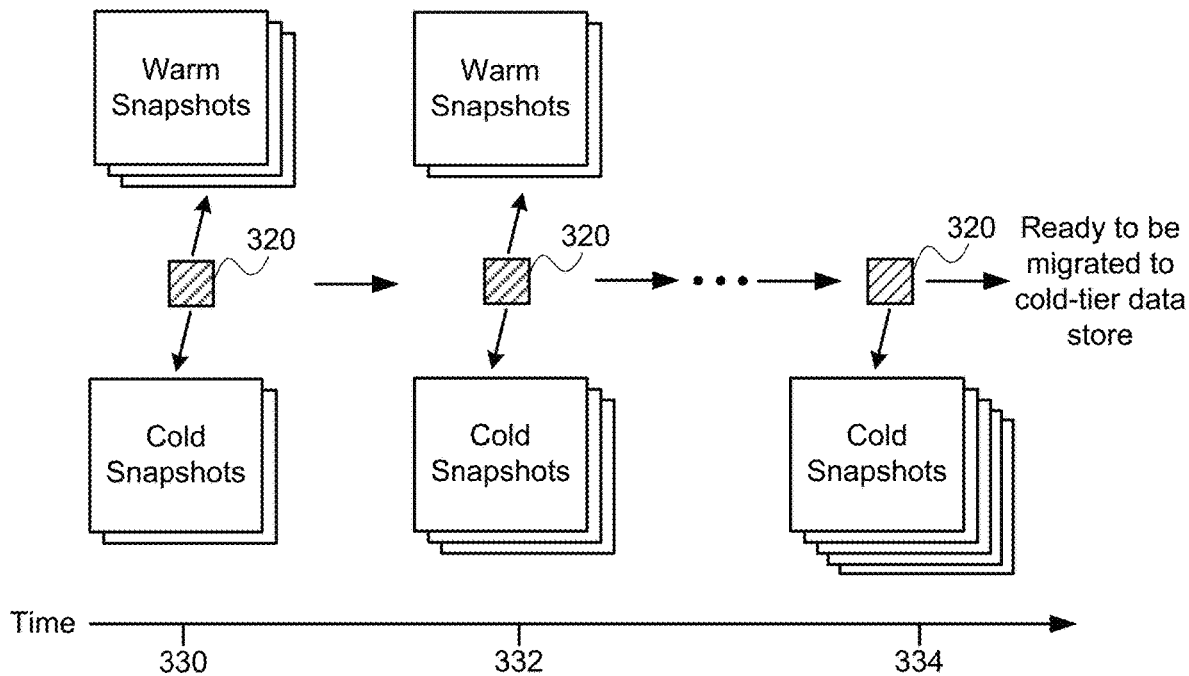
FIG. 3B is a conceptual diagram illustrating an example process of evaluating migration criteria of a data block from a warm-tier data store to a cold-tier data store, in accordance with an embodiment.
Figure 3C:
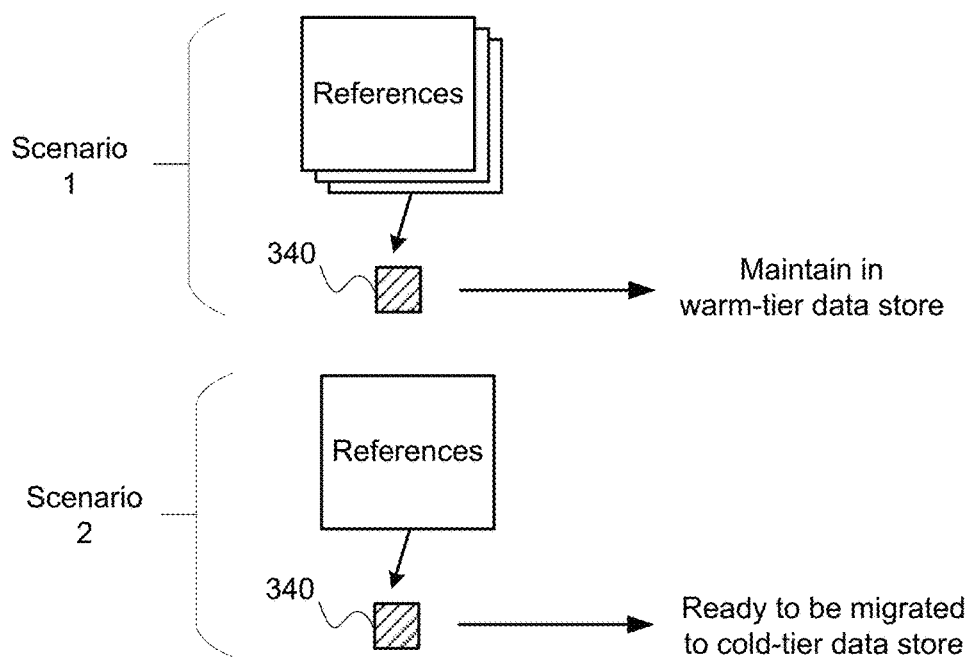
FIG. 3C is a conceptual diagram illustrating another example process of evaluating migration criteria of a data block from a warm-tier data store to a cold-tier data store, in accordance with an embodiment.

FIGS. 3A-3C are conceptual diagrams illustrating data blocks that are managed by the data management server 120 and the mitigation of data blocks, in accordance with an example embodiment.

FIG. 3A is a conceptual diagram that illustrates the relationship between snapshots and data blocks, in accordance with an example embodiment. In a data storage system, such as a deduplication data storage system, a data block 310 may be stored in a data store 130 or 135. The data store may store data that are part of multiple snapshots. One or more snapshots 1, 2, . . . , N shown in FIG. 3A may be snapshots that are associated with the same client device 110 and/or same users, such as snapshots that are captured at different times. One or more snapshots 1, 2, ..., N may also be snapshots that are associated with different client devices 110 and/or different users.

For a particular snapshot, it may include multiple data blocks, as illustrated by the squares in each of the snapshots in FIG. 3A. While the snapshots are illustrated as having a certain number of data blocks, the snapshots stored in a data store according to various embodiments do not need to be of the same number of data blocks or of the same size. Similarly, while the data blocks are illustrated as the squares in FIG. 3A, the data blocks according to various embodiments do not need to be of the same size or having a fixed length.

A data block may be referenced by more than one snapshot. Various snapshots may have the same data in certain portions and different data in other portions. A data store 130 or 135 may not need to store multiple copies of the same data block. Instead, each snapshot may reference a particular data block as the data at a certain location of the snapshot. For example, the snapshot 312 may include data block 310 at a certain location that is illustrated as a shaded block in the third row. Likewise, the snapshots 314 and 316 may include the same data block 310 at different locations. The snapshots 312, 314, 316, etc. may reference the data block 310 by including the reference information in the metadata of the snapshots to indicate that each of those snapshots includes the data block 310 at a certain location. The data block 310 may be associated with a total reference count, which may be a metadata entry that determines the total number of snapshots that reference the data block 310. The snapshots may be cold snapshots or warm snapshots in determining the total reference count.

The various reference counts, such as the total reference count, the cold reference count, and the warm reference count may be snapshot-based as discussed above, back reference-based, or based on another suitable mechanism. For back reference-based count, a back reference of a data block may correspond to the files, the users, and/or the client devices 110 that reference or are related to the data block. In one embodiment, the data management server 120 may create a back reference when a data block is uploaded. The back reference may denote the user, client device 110, file, and offset within the file that refers to the data block. When a data block having a unique fingerprint is uploaded during a backup operation for the first time, a back reference may be created and the back reference count may be set to one. When a match for the fingerprint of the data block is found during another backup, a new back reference may be created and also denote the user, client device 110, file, and offset that upload the data block in this particular instance. The back reference count may be incremented by one. A data management server 120 may occasionally perform compaction operations that remove data blocks and back references that are no longer needed. A back reference may be deleted during compaction when none of the snapshots retained by a user contain the data block. The data block may be deleted from a data store when the back reference is deleted or the back reference count drops to zero.

FIG. 3B is a conceptual diagram illustrating an example process of determining migration criteria of a data block from a warm-tier data store 130 to a cold-tier data store 135, in accordance with an embodiment. At a particular point in time, a data block 320 may be referenced by a number of snapshots, some may be warm, and others may be cold. A warm snapshot may be a snapshot that is captured recently from a client device 110. A warm snapshot may transition to a cold snapshot when one or more transition criteria are met.

Various client devices 110 may have different transition criteria to determine whether a warm snapshot should transition to a cold snapshot. For example, in one embodiment, the transition criterion is time. A warm snapshot will automatically become a cold snapshot after the passage of a threshold number of days since the snapshot has been captured. In other embodiments, other transition criteria may additionally or alternatively be used. For example, another criterion for a particular snapshot may be the number of snapshots captured succeeding the particular snapshot. Other example criteria may include the types of files included in the snapshots, the natures of the snapshots, manual preferences and determination by a client, etc. In one embodiment, a client associated with a client device 110 may define the criteria to transition a warm snapshot to a cold snapshot. Additionally, or alternatively, the data management server 120 may also define the criteria.

In the example shown in FIG. 3B, at a particular point in time 330 the data block 320 may be referenced by three warm snapshots and two cold snapshots. Hence, the snapshot-based total reference count is 5. When a data block is first uploaded, the data block is saved in a warm-tier data store 130 because the data block is referenced at least by a warm snapshot. The data management server 120 may also maintain another count such as the cold reference count or the warm reference count. The counts may be saved as metadata of the data block 320. As time continues, more and more warm snapshots may have transitioned to cold snapshots. For example, at time 332, an additional warm snapshot has transitioned to a cold snapshot. Hence, the warm reference count is now 2 and the cold reference count is now 3. At time 334, all of the warm snapshots that reference the data bock 320 have transitioned to become cold snapshots. At this moment, the warm reference count is 0 and the cold reference count is 5, which is equal to the total reference count. At time 334, the data block 320 that is originally stored in the warm-tier data store 130 is now ready to be migrated to the cold-tier data store 135. The data management server 120 may put the data block 320 into a candidate queue for the data migration.

FIG. 3C is a conceptual diagram illustrating another example process of evaluating migration criteria of a data block from a warm-tier data store 130 to a cold-tier data store 135, in accordance with an embodiment. When the data block 340 is first uploaded (backed up), the data block 340 is saved in a warm-tier data store 130. In some embodiments, the data block 340 may be included in a warm snapshot. The warm snapshot may transition to a cold snapshot based on one or more of the criteria described above in association with FIG. 3B.

The data block 340 may be referenced by any number of users and/or any number of client devices 110. In scenario 1, as illustrated in FIG. 3C, the data block 340 may be referenced by 3 individual references (e.g., 3 individual client devices). Hence, the back reference-based total reference count is 3. In scenario 1, the total reference count is greater than a threshold total reference count, as such, the data block 340 remains in the warm-tier data store 130. In scenario 2, the data block 340 may be referenced by only 1 individual reference (e.g., 1 individual client device) and the back reference-based total reference count is 1. In scenario 2, the total reference count is equal to or less than a threshold total reference count. The threshold total reference count may be established by the client, by the data storage provider company, or some other entity. With the total reference count being equal to or less than the threshold total reference count, the data block 340 that is originally stored in the warm-tier data store 130 is ready to be migrated to the cold-tier data store 135. For scenario 2, the threshold total reference count may be 2 or 1. In other embodiments, the threshold total reference count may be any other non-negative integer. The data management server 120 may put the data block 340 into a candidate queue for the data migration.

Figure 4A:
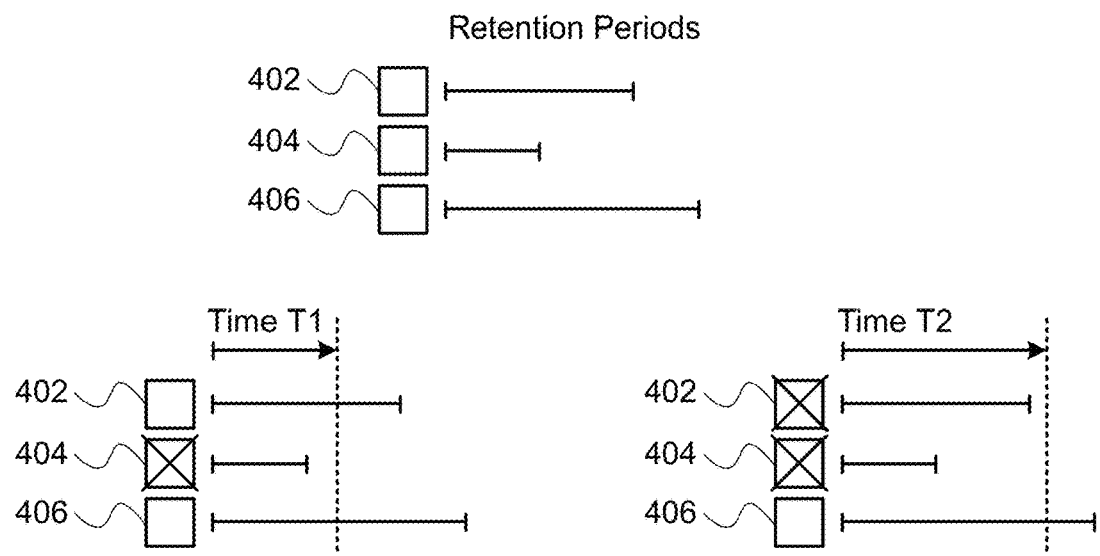
FIG. 4A is a conceptual diagram that illustrates retention periods of data blocks stored in a cold-tier data store, in accordance with an embodiment.

FIG. 4A is a conceptual diagram that illustrates retention periods of data blocks stored in a cold-tier data store 135, in accordance with an embodiment. Three different data blocks 402, 404, and 406 are shown as examples in FIG. 4A. Each of the data blocks 402, 404, and 406 is referenced by one or more cold snapshots. The cold snapshots that commonly reference a data block may have different retention periods, depending on the timing of captures of the snapshots and the retention requirements specified by the client devices 110 that provide the snapshots. In one embodiment, the data management server 120 may determine the retention period of a data block by identifying a list of snapshots referencing the data block. The data management server 120 may examine the retention requirement for each of the snapshots on the list. The retention requirement may be expressed in terms of time, files included in the snapshots, users accessing the client device 110, types of files, types of snapshots, and/or other suitable criteria. The data management server 120 may determine the maximum retention period of the data block based on the retention requirement for each of the snapshots on the list. For example, if a first snapshot referencing the data block requires a retention period of one year while a second snapshot referencing the data block requires a retention period of two years, the retention period of the data block may at least be two years. In FIG. 4A, the bars next to the data blocks 402, 404, and 406 represent the differences in retention periods of those data blocks.

In some embodiments, a cold-tier data store 135 may be associated with a per-write request cost for writing a unit of data. Also, the cold-tier data store 135 may allow the unit to be significantly larger than the typical size of a data block. For example, for a cold-tier data store 135 that uses object storage or file storage, the size limit of the object or file allowed to be stored can be in the order of gigabytes or even terabytes while a typical size of a data block may be in the order of megabytes. Due to the potential per-write request cost associated with a cold-tier data store 135, the data management server 120 may combine multiple data blocks as a unit (e.g., an object) and store the unit in a single write request. However, in some embodiments, owing to the restraints and data system of a cold-tier data store 135, a unit of data may not be able to be modified without another write request, which may incur an additional cost. For example, in certain object storage systems, the identifier of an object may be the checksum of the object. A modification of the object will result in a new object, which will need another write request to store the modified object in a data store.

FIG. 4A illustrates an issue in writing data blocks to a cold-tier data store 135 when data blocks are migrated from a warm-tier data store 130. If the data blocks 402, 404, and 406 are written to a cold-tier data store 135 separately and individually, the cost of three write requests will be incurred. As such, it could triple the costs in writing the data. If the data blocks 402, 404, and 406 are combined as a unit (e.g., an object), only one write request is needed to store the data blocks 402, 404, and 406 to the cold-tier data store 135. However, the data blocks each have different retention periods with data block 404 having the shortest retention period and data block 406 having the longest retention period. At time T1, all snapshots that reference the data block 404 are retired and the data block 404 is no longer needed to be saved, as indicated by the data block 404 being crossed out. Yet, since the data blocks 402, 404, and 406 are stored as a unit, the unit may not be able to be modified without incurring additional cost in writing the modified unit. As a result, the portion of the unit including the data block 404 may continue to be stored in the cold-tier data store 135, thereby occupying storage space and incurring unnecessary storage costs. At time T2, both data blocks 402 and 404 are no longer needed to be saved, but the data blocks 402 and 404 may continue to be stored in the cold-tier data store 135 until the data block 406 has passed its retention period. At a time when all data blocks stored in a unit have passed their retention periods, the entire unit may be deleted from the cold-tier data store 135.

Figure 4B:
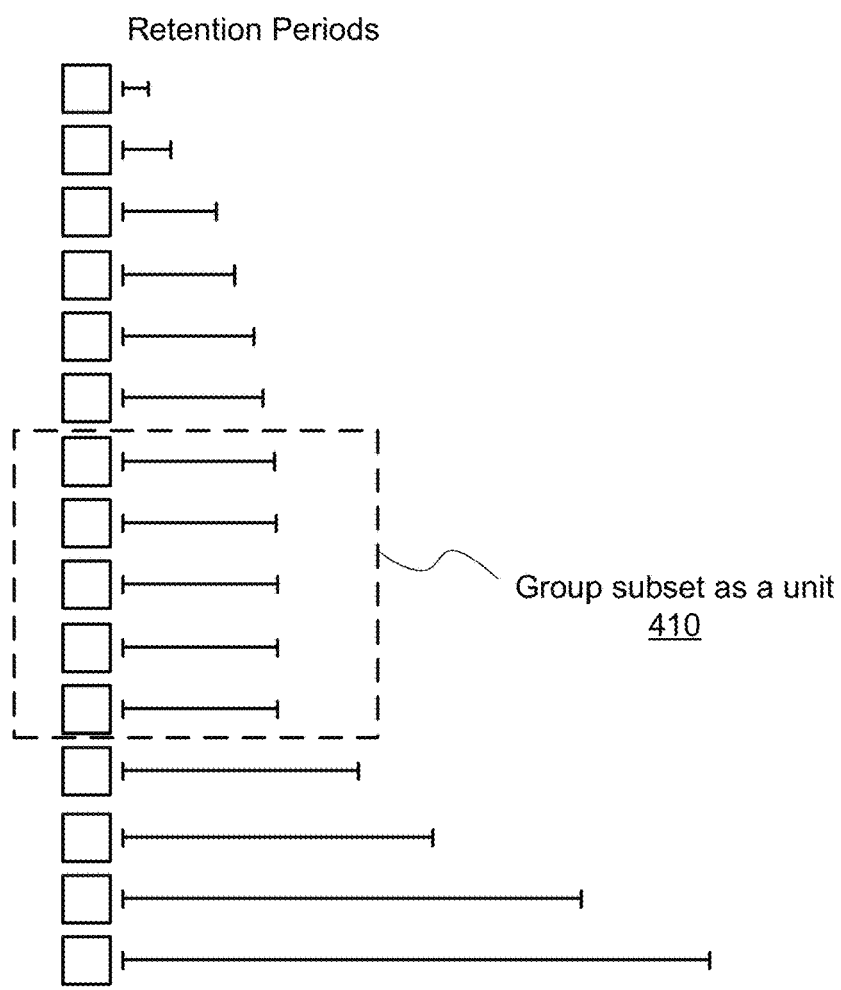
FIG. 4B is a conceptual diagram that illustrates a candidate queue in migrating data blocks from a warm-tier data store to a cold-tier data store based on retention periods, in accordance with an embodiment.

FIG. 4B is a conceptual diagram that illustrates a candidate queue for migrating data blocks from a warm-tier data store 130 to a cold-tier data store 135 based on retention periods, in accordance with an embodiment. When a data block is ready to be migrated to the cold-tier data store 135, the data management server 120 may send the data block to a candidate queue, instead of directly writing the data block to the cold-tier data store 135 or directly grouping the data block with other data blocks as a unit. The data management server 120 may sort the data blocks in the candidate queue by the retention periods of the data block, as illustrated in FIG. 4B. For example, each data block may be associated with a retention timestamp, which is metadata that indicates the time after which the data block may no longer be needed for storage for any file. The data management server 120 may sort the data blocks based on the retention timestamps. The data management server 120 may then select some of the data blocks sorted as a subset of data blocks to be grouped as a unit 410 for a write request at the cold-tier data store 135. The selected data blocks in the subset may have the retention periods within a threshold range among each other so that the data blocks in the unit will expire at around the same time, thereby improving the storage efficiency of the cold-tier data store 135.

The data blocks that are not selected in a subset to be grouped as a unit may remain in the candidate queue until there are sufficient data blocks that have similar retention periods in the candidate queue. Whether there are sufficient data blocks to be grouped as a unit may depend on the number of data blocks and the size of a unit allowed by the cold-tier data store 135. In one embodiment, the data management server 120 may attempt to group as many data blocks as possible in a unit to reduce the overall write request costs associated with storing the data.

Figure 5:
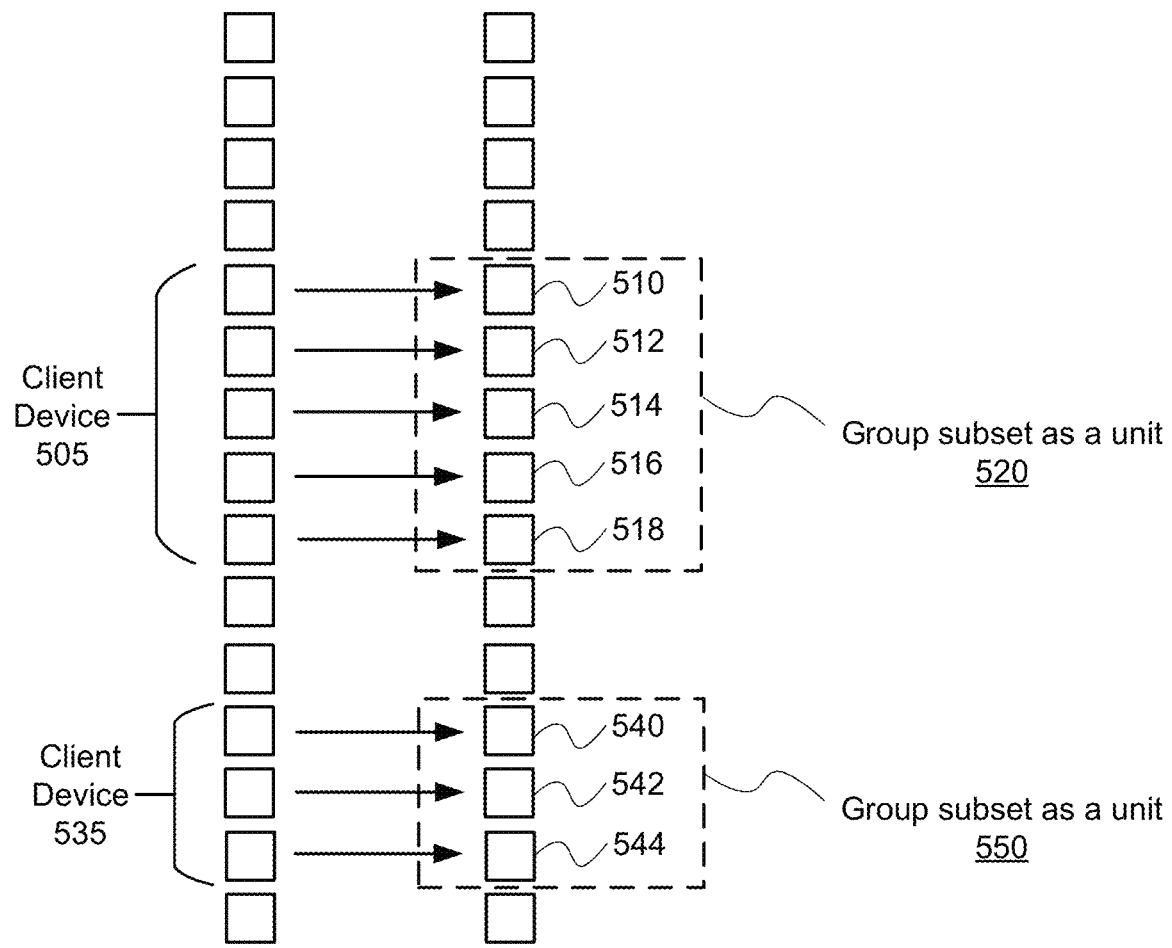
FIG. 5 is a conceptual diagram that illustrates a candidate queue in migrating data blocks from a warm-tier data store to a cold-tier data store based on expected restoration, in accordance with an embodiment.

FIG. 5 is a conceptual diagram that illustrates a candidate queue for migrating data blocks from a warm-tier data store 130 to a cold-tier data store 135 based on expected restoration, in accordance with an embodiment. When a data block is ready to be migrated to the cold-tier data store 135, the data management server 120 may send the data block to a candidate queue, instead of directly writing the data block to the cold-tier data store 135 or directly grouping the data block with other data blocks as a unit. The data management server 120 may sort the data blocks in the candidate queue by expected restoration of the data block(s), as illustrated in FIG. 5. The expected restoration of the data block(s) corresponds to the user and/or client device that is referencing each respective data block.

In this illustrated example, several data blocks (data blocks 510-518) in the candidate queue are only referenced by a client device 505 and other data blocks (data blocks 540-544) in the candidate queue are only referenced by a client device 535. The data management server 120 may then select the data blocks 510-518 as a subset of data blocks to be grouped as a unit 520 and select data blocks 540-544 as another subset of data blocks to be grouped as a unit 550 for one or more write requests at the cold-tier data store 135. The selected data blocks in the subset may have similar expected restoration so that the data blocks in the unit may be restored at around the same time, thereby improving the storage efficiency of the cold-tier data store 135.

In some embodiments, the data management server 120 may sort the data blocks in the candidate queue by file and/or by folder or subfolder (not shown). For example, data blocks representing data of a single file may be grouped as a unit for one or more write requests at the cold-tier data store 135. The unit may have similar expected restoration such that data blocks in the unit may be restored at around the same time. In another example, data blocks representing data of multiple files belonging to a same folder or subfolder may be grouped as a unit for one or more write requests at the cold-tier data store 135.

Example Data Migration Processes

Figure 6:
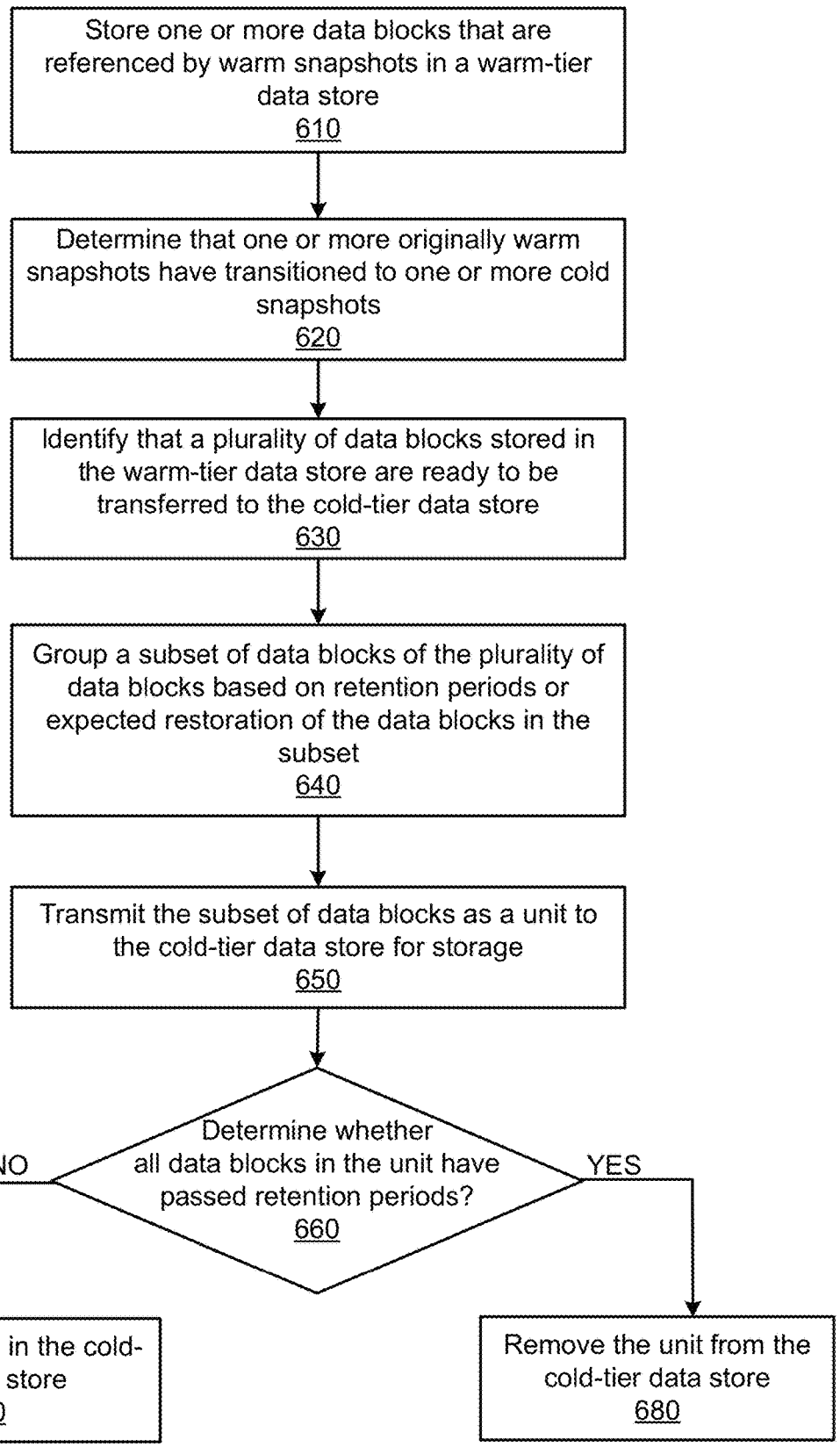
FIG. 6 is a flowchart depicting an example process of data migration in a backup management system, in accordance with an embodiment.

FIG. 6 is a flowchart depicting an example process 600 of data migration in a backup management system, in accordance with an example embodiment. The process 600 may be performed to capture data from client devices 110 until the data are ready to retire. In one embodiment, a data management server 120 may capture snapshots from various client devices 110. For example, the snapshots may be captured as snapshots that are stored in a deduplicated data system that receives the snapshots from multiple users. The capturing of snapshots may be performed by the data management server 120 (e.g., pulling data from client devices 110 directly or through a backup application installed in the client devices 110) and may be initiated by the client devices 110 (e.g., pushing data to the data management server 120 or directly to a data store 130). The newly captured snapshots may be classified as warm snapshots. The data management server 120 may store 610 one or more data blocks that are referenced by warm snapshots in a warm-tier data store 130. In some cases, because of the deduplication process, one or more of the data blocks are backup data that is shared by more than one user.

The data management server 120 may determine 620 that one or more originally warm snapshots have transitioned to one or more cold snapshots. For example, the data management server 120 may periodically fetch a list that enumerates identifiers of warm snapshots. As time goes by, additional snapshots may be captured from various client devices 110 and some warm snapshots begin to transition into cold snapshots. The criteria for transitioning a warm snapshot to a cold snapshot may be the same or may vary among different client devices 110. For example, in some cases, the transition criteria may be based on the time that has passed after the snapshots are captured. Other suitable criteria may also be used.

The data management server 120 may identify 630 that a plurality of data blocks stored in the warm-tier data store 130 are ready to be transferred to a cold-tier data store 135. The readiness for a data block to be transferred may be due to the one or more originally warm snapshots having transitioned to the one or more cold snapshots. For example, the plurality of data blocks that are ready to be transferred may be referenced by one or more originally warm snapshots that have transitioned into cold snapshots. One or more criteria may be used to determine whether a data block is ready to be transferred.

For example, in one embodiment, the data management server 120 may determine a snapshot-based total reference count and a cold reference count of a data block. In response to an originally warm snapshot that has recently transitioned into a cold snapshot, the data management server 120 may increment the cold reference count by one. When the cold reference count equals to the total reference count, the data management server 120 may determine that the particular data block is ready to be transferred. Alternatively, or additionally, a warm reference count may be used. When the warm reference count of a data block reaches zero, the data management server 120 may determine that the data block is ready to be transferred.

In some embodiments, the data management server 120 may determine a back reference-based total reference count. In response to a data block being uploaded for a first time during a backup operation, a back reference count may be set to one. When a match for the fingerprint of the data block is found during another backup, the back reference count may be incremented by one. The back reference-based total reference count corresponds to the total count of the back reference count of a data block. When the back reference-based total reference count equals or is less than a threshold, the data management server 120 may determine that the particular data block is ready to be transferred.

Metrics other than the warm reference count, the cold reference count, or the threshold total reference count may also be used to determine whether a data block is ready to be transferred. For example, in some embodiments, timestamps of the data blocks may also be used.

In some embodiments, the data management server 120 may impose one or more additional or alternative rules before a data block is migrated from the warm-tier data store 130 to the cold-tier data store 135. For example, the rule may be cost related. In one embodiment, the rule is satisfied when a first expected cost of keeping the data block in the warm-tier data store is higher than a second expected cost. The second expect cost may include a combination of one or more of the following costs, including an expected cost of writing the data block to the cold-tier data store 135, an expected cost of maintaining the data block in the cold-tier data store 135, and an expected cost of restoring the data block from the cold-tier data store 135. In one embodiment, a rule may be expressed by the following equation (1) and be implemented in the code of the data management server 120 in management the data migration.

$$Cw > Cc + Cm/T + Cr*R/T \quad (1)$$

In equation (1), Cw is the storage cost per period for a warm-tier data store 130. Cc is the storage cost per period for a cold-tier data store 135. Cm is a one-time cost incurred in migrating the data to the cold-tier data store 135. The Cm may be incurred based on the number of write requests made on the cold-tier data store 135. T is the number of periods that the data block is expected to be retained in the cold-tier data store 135. The expected retention period may be determined based on the retention policies of each snapshot that references the data block. In one case, the expected retention period may be the maximum retention period among various snapshots that reference the data block. Cr is the additional cost in restoring data from the cold-tier data store 135. For example, in addition to having more costly write requests, a cold-tier data store 135 may be associated with more costly read requests. R is an average expected number of restores for a data block that has migrated to the cold-tier data store 135. Using the rule expressed in equation (1) may reduce the cost of managing data blocks that are not retained for a long duration (e.g., T is small) because those data blocks may not satisfy the equation (1). Hence, those data blocks are not transferred to a cold-tier data store 135.

The data management server 120 may group 640 a subset of data blocks of the plurality of data blocks that are ready to be transferred. In some embodiments, the grouping may be based on the retention periods of the data blocks in the subset. For example, the data blocks that are ready to be transferred may be sent to a candidate queue and be sorted by retention periods, as illustrated in FIG. 4B. Data blocks that have similar retention periods may be selected as a subset to be transferred together to a cold-tier data store 135. In some embodiments, the grouping may be based on expected restoration time of the data blocks in the subset. For example, the data blocks that are ready to be transferred may be sent to a candidate queue and be sorted by expected restoration, as illustrated in FIG. 5. Data blocks that have similar expected restoration may be selected as a subset to be transferred together to a cold-tier data store 135.

The data management server 120 may transmit 650 the subset of data blocks as a unit to the cold-tier data store 135 for storage. The unit may be an object if the cold-tier data store 135 is an object storage data store. Other types of units may be used, depending on the data format or structure of the cold-tier data store 135. As the data blocks in the subset have migrated to the cold-tier data store 135, the data management server 120 may update the metadata of the data blocks to point to the unit in the cold-tier data store 135. For example, a data block's namespace metadata, which may include the address (e.g., blockmap and offset) of the data block, may be updated to reflect the migration of the data block. The data blocks stored in the warm-tier data store 130 may then be deleted. When a data block is moved to a cold-tier data store 135, the data block may not be deduplicated with new backup data coming in the warm-tier data store 130. The data management server 120 may remove the data block's fingerprint entry that links to the warm-tier data store 130 from the deduplication index 240.

For units that are stored in the cold-tier data store 135, the data management server 120 may perform periodic checks to determine whether the units are ready to retire and be deleted. For example, for a particular unit, the data management server 120 may determine 660 whether all data blocks in the unit have passed their respective retention periods. If at least one of the data blocks in the unit has not passed its retention period, the data management server 120 may retain 670 the unit in the cold-tier data store 135. If all of the data blocks in the unit have passed their retention periods, the data management server 120 may remove 680 the unit from the cold-tier data store 135. For example, in an object storage system, an object in a cold-tier data store 135 may be garbage collected when all of the data blocks stored within the object are no longer needed by any snapshots.

In determining whether a unit in the cold-tier data store 135 may be deleted, the data management server 120 may maintain a valid block count for each unit as metadata. This valid block counter may be initialized as the number of data blocks stored inside the unit. In response to a data block being no longer needed by its referred snapshots (e.g., the data block has passed its retention period), the data management server 120 may decrement the valid block count by 1. When the count reaches zero, the unit in the cold-tier data store 135 may be removed.

Figure 7:
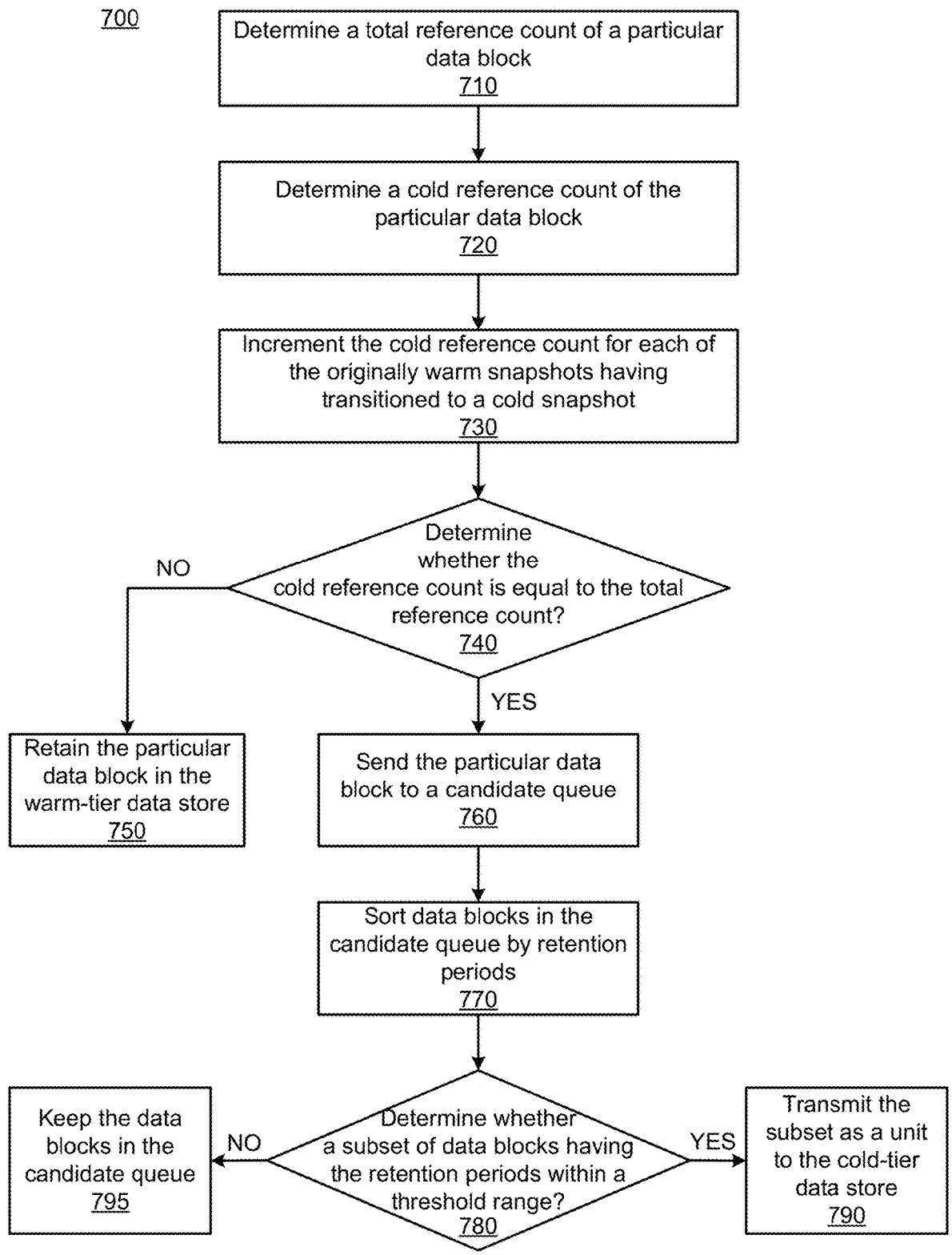
FIG. 7 is a flowchart depicting an example process of migrating data blocks from a warm-tier data store to a cold-tier data store based on retention periods, in accordance with an embodiment.

FIG. 7 is a flowchart depicting an example process 700 of migrating data blocks from a warm-tier data store 130 to a cold-tier data store 135 based on retention periods, in accordance with an embodiment. The process 700 may be an example of process 600. For a particular data block that is saved in a warm-tier data store 130 after snapshots are captured, the data management server 120 may determine 710 a total reference count of the particular data block. The total reference count may represent a total number of snapshots that reference the particular data block. The snapshots may be warm or cold. The data management server 120 may determine 720 a cold reference count of the particular data block. The cold reference count may represent a number of cold snapshots that reference the particular data block. The data management server 120 may increment 730 the cold reference count for each of the originally warm snapshots that reference the particular data block having transitioned to a cold snapshot.

The data management server 120 may determine 740 whether the cold reference count of the particular data block is equal to the total reference count. If the particular data block's cold reference count is not equal to the total reference count, the data management server 120 may retain 750 the particular data block in the warm-tier data store 130. If the particular data block's cold reference count is equal to the total reference count, the data management server 120 may send 760 the particular data block to a candidate queue because the particular data block is determined to be ready to be migrated to a cold-tier data store 135. In some embodiments, the data management server 120 may impose additional or alternative rules before a particular data block is sent to the candidate queue. For example, the data management server 120 may apply a rule that is represented by equation (1) as explained above.

In a candidate queue, a plurality of data blocks that are ready to be migrated to the cold-tier data store 135 is present. The data management server 120 may sort 770 the data blocks in the candidate queue by their retention periods. The data management server 120 may select a subset of the data blocks that have their retention periods that are close to each other. The data management server 120 may determine 780 whether the subset of data blocks having the retention periods within a threshold range of each other. If so, the data management server 120 may transmit 790 the subset of data blocks as a unit to the cold-tier data store 135. If not, the data management server 120 may keep 795 the data blocks in the candidate queue.

While in this disclosure data may be divided into warm tier and cold tier, some embodiments may also divide data into more than two tiers and use similar data migration techniques and processes to manage the data. Those tiers may simply be referred to as a first tier, a second tier, a third tier, etc. Likewise, a system may include more than only a warm-tier data store and a cold-tier data store.

Figure 8:
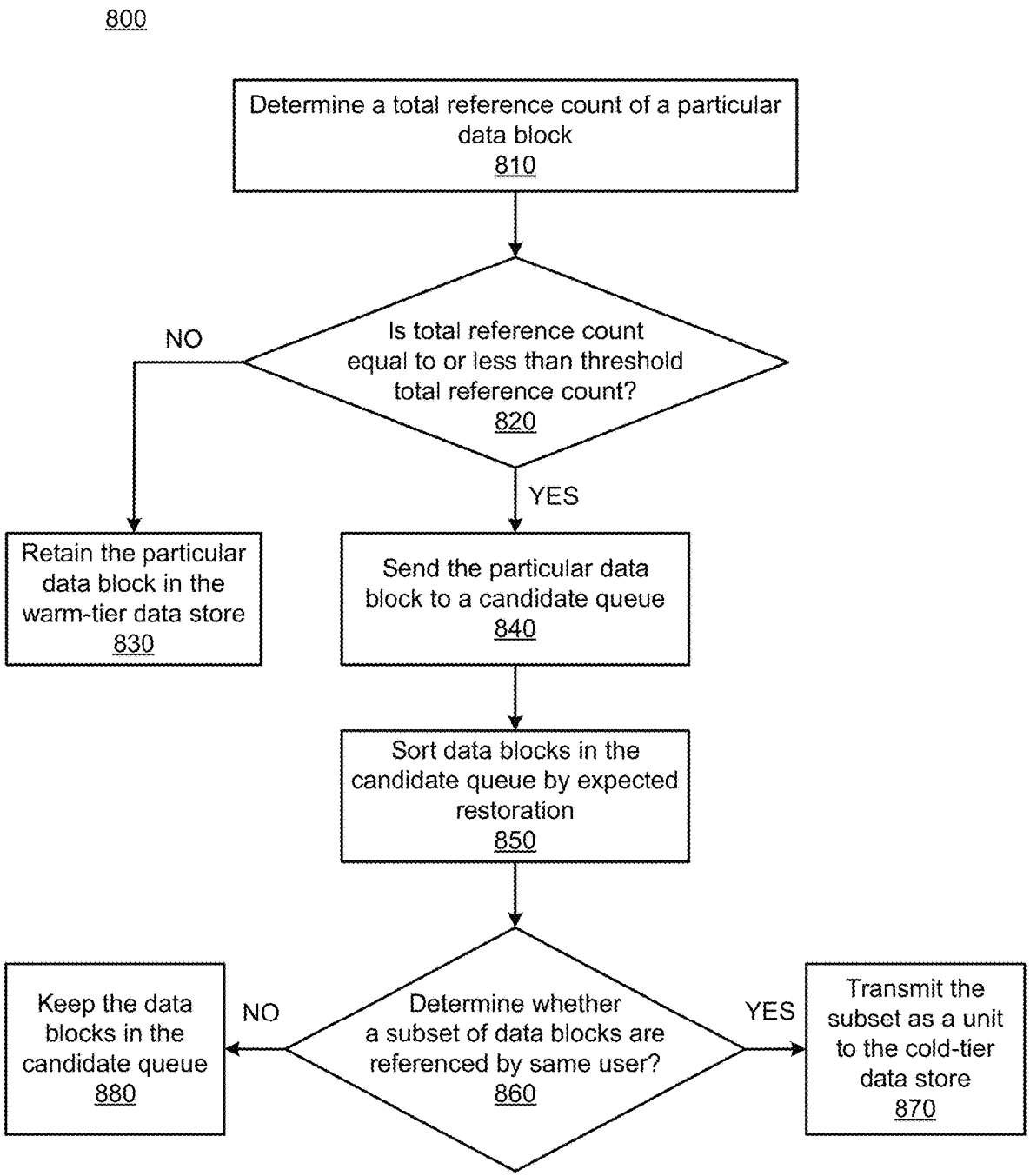
FIG. 8 is a flowchart depicting an example process of migrating data blocks from a warm-tier data store to a cold-tier data store based on expected restoration, in accordance with an embodiment.

FIG. 8 is a flowchart depicting an example process 800 of migrating data blocks from a warm-tier data store 130 to a cold-tier data store 135 based on expected restoration, in accordance with an embodiment. The process 800 may be an example of process 600. For a particular data block that is saved in a warm-tier data store 130 after snapshots are captured, the data management server 120 may determine 810 a total reference count of the particular data block. The total reference count may represent a total number of users and/or client devices 110 that reference the particular data block.

The data management server 120 may determine 820 whether the total reference count of the particular data block is equal to or less than a threshold total reference count. If the particular data block's total reference count is not equal to or less than the threshold total reference count, the data management server 120 may retain 830 the particular data block in the warm-tier data store 130. If the particular data block's total reference count is equal to or less than the threshold total reference count, the data management server 120 may send 840 the particular data block to a candidate queue because the particular data block is determined to be ready to be migrated to a cold-tier data store 135. In some embodiments, the data management server 120 may impose additional or alternative rules before a particular data block is sent to the candidate queue as described above in association with FIG. 7.

In a candidate queue, a plurality of data blocks that are ready to be migrated to the cold-tier data store 135 is present. The data management server 120 may sort 850 the data blocks in the candidate queue by their expected restoration. For example, multiple data blocks referenced by a particular client device 110 may be restored together if the particular client device 110 were to be victim of a malware attack or suffer a computer crash. Any or all data blocks referenced by the particular client device 110 would have similar expected restoration. The data management server 120 may determine 860 whether a subset of data blocks is referenced by a same user or by a same client device 110. If so, the data management server 120 may transmit 870 the subset of data blocks as a unit to the cold-tier data store 135. If not, the data management server 120 may keep 880 the data blocks in the candidate queue.

Computing Machine Architecture

Figure 9:
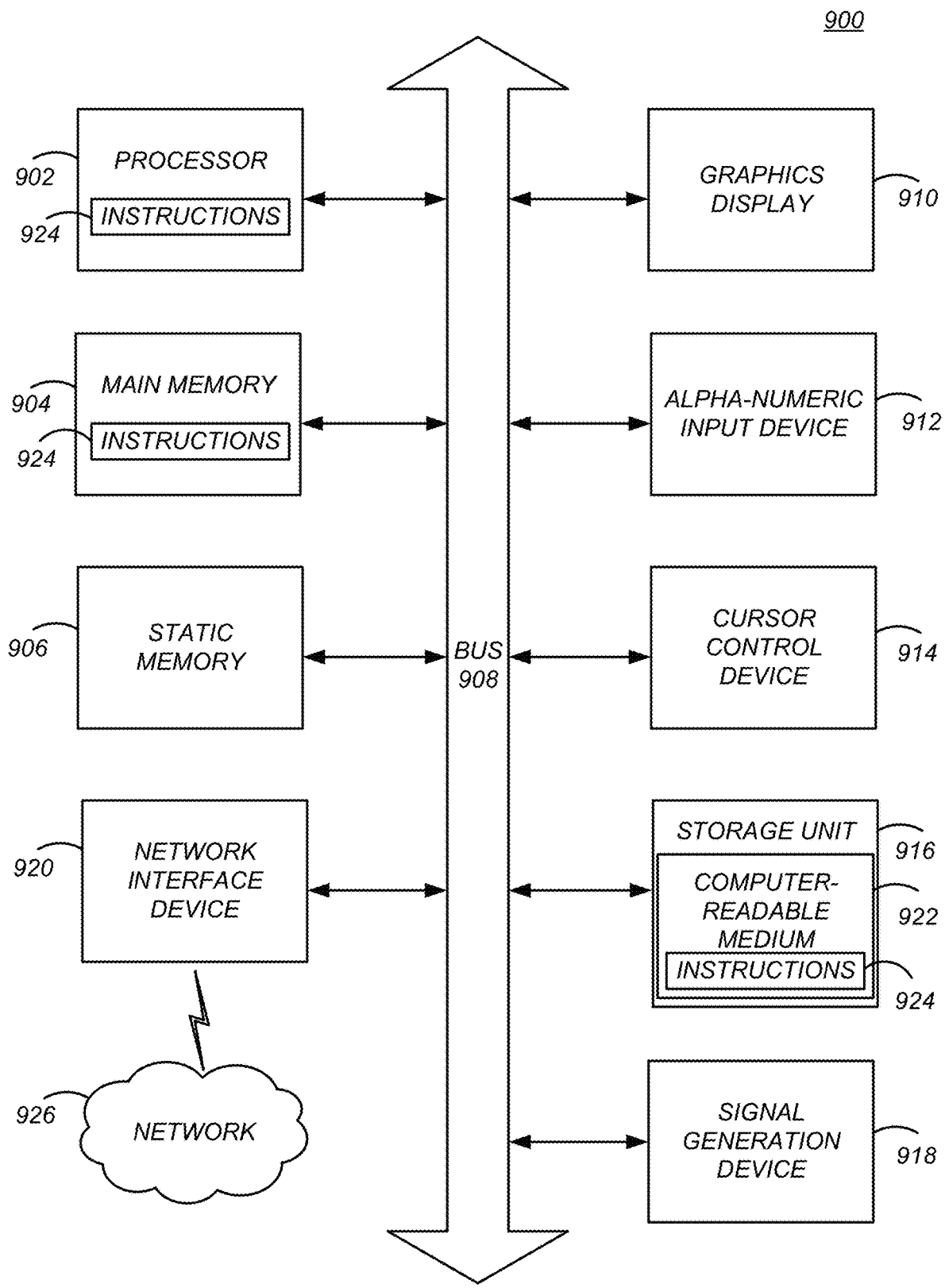
FIG. 9 is a block diagram illustrating components of an example computing machine, in accordance with an embodiment.

FIG. 9 is a block diagram illustrating components of an example computing machine that is capable of reading instructions from a computer readable medium and execute them in a processor. A computer described herein may include a single computing machine shown in FIG. 9, a virtual machine, a distributed computing system that includes multiples nodes of computing machines shown in FIG. 9, or any other suitable arrangement of computing devices.

By way of example, FIG. 9 shows a diagrammatic representation of a computing machine in the example form of a computer system 900 within which instructions 924 (e.g., software, program code, or machine code), which may be stored in a computer readable medium for causing the machine to perform any one or more of the processes discussed herein may be executed. In some embodiments, the computing machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The structure of a computing machine described in FIG. 9 may correspond to any software, hardware, or combined components shown in FIGS. 1 and 2, including but not limited to, the client device 100, the data management server 120, and various engines, interfaces, terminals, and machines shown in FIG. 2. While FIG. 9 shows various hardware and software elements, each of the components described in FIGS. 1 and 2 may include additional or fewer elements.

By way of example, a computing machine may be a personal computer (PC), a tablet PC, a set-top box (STB), a personal digital assistant (PDA), a cellular telephone, a smartphone, a web appliance, a network router, an internet of things (IoT) device, a switch or bridge, or any machine capable of executing instructions 924 that specify actions to be taken by that machine. Further, while only a single machine is illustrated, the term "machine" and "computer" also may be taken to include any collection of machines that individually or jointly execute instructions 924 to perform any one or more of the methodologies discussed herein.

The example computer system 900 includes one or more processors 902 such as a CPU (central processing unit), a GPU (graphics processing unit), a TPU (tensor processing unit), a DSP (digital signal processor), a system on a chip (SOC), a controller, a state equipment, an application-specific integrated circuit (ASIC), a field-programmable gate array (FPGA), or any combination of these. Parts of the computing system 900 also may include memory 904 that store computer code including instructions 924 that may cause the processors 902 to perform certain actions when the instructions are executed, directly or indirectly by the processors 902. Memory 904 may be any storage devices including non-volatile memory, hard drives, and other suitable storage devices. Instructions can be any directions, commands, or orders that may be stored in different forms, such as equipment-readable instructions, programming instructions including source code, and other communication signals and orders. Instructions may be used in a general sense and are not limited to machine-readable codes.

One and more methods described herein improve the operation speed of the processors 902 and reduces the space required for the memory 904. For example, the architecture and methods described herein reduce the complexity of the computation of the processors 902 by applying one or more novel techniques that simplify the steps generating results of the processors 902 and reduce the cost of using various data stores 130 and 135. The algorithms described herein also reduce the storage space requirement for memory 904.

The performance of certain of the operations may be distributed among the more than processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations. Even though in the specification or the claims may refer some processes to be performed by a processor, this should be construed to include a joint operation of multiple distributed processors.

The computer system 900 may include a main memory 904, and a static memory 906, which are configured to communicate with each other via a bus 908. The computer system 700 may further include a graphics display unit 910 (e.g., a plasma display panel (PDP), a liquid crystal display (LCD), a projector, or a cathode ray tube (CRT)). The graphics display unit 910, controlled by the processors 902, displays a graphical user interface (GUI) to display one or more results and data generated by the processes described herein. The computer system 900 also may include alpha-numeric input device 912 (e.g., a keyboard), a cursor control device 914 (e.g., a mouse, a trackball, a joystick, a motion sensor, or other pointing instrument), a storage unit 916 (e.g., a hard drive, a solid-state drive, a hybrid drive, a memory disk, etc.), a signal generation device 918 (e.g., a speaker), and a network interface device 920, which also are configured to communicate via the bus 908.

The storage unit 916 includes a computer readable medium 922 on which is stored instructions 924 embodying any one or more of the methodologies or functions described herein. The instructions 924 also may reside, completely or at least partially, within the main memory 904 or within the processor 902 (e.g., within a processor's cache memory) during execution thereof by the computer system 900, the main memory 904 and the processor 902 also constituting computer readable media. The instructions 924 may be transmitted or received over a network 926 via the network interface device 920.

While computer readable medium 922 is shown in an example embodiment to be a single medium, the term "computer readable medium" should be taken to include a single medium or multiple media (e.g., a centralized or distributed database, or associated caches and servers) able to store instructions (e.g., instructions 924). The computer readable medium may include any medium that is capable of storing instructions (e.g., instructions 924) for execution by the processors (e.g., processors 902) and that causes the processors to perform any one or more of the methodologies disclosed herein. The computer readable medium may include, but not be limited to, data repositories in the form of solid-state memories, optical media, and magnetic media. The computer readable medium does not include a transitory medium such as a propagating signal or a carrier wave.

Additional Considerations

Beneficially, the systems and processes described herein improve the efficiency and reduce the cost of a backup management system. Various organizations and enterprises often have different data backup, retention, and restoration requirements and may rely on a third-party cloud-based backup management system to manage the backup data. A backup management system that allows the deduplication of data among various customers may significantly reduce the storage space. A large amount of data may be uploaded to the backup management system as a result of snapshots captured from numerous client devices. The system and processes described herein allow the backup management system to migrate data that are expected to be inactive to a cold-tier data store in a cost-effective manner and reduce the storage space in data stores. In some embodiments, the systems and processes do so by grouping data blocks that have similar retention periods as a unit to be stored in the cold-tier data store. In some embodiments, the systems and processes do so by grouping data blocks that have similar expected restoration as a unit to be stored in the cold-tier data store.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Any feature mentioned in one claim category, e.g. method, can be claimed in another claim category, e.g. computer program product, system, storage medium, as well. The dependencies or references back in the attached claims are chosen for formal reasons only. However, any subject matter resulting from a deliberate reference back to any previous claims (in particular multiple dependencies) can be claimed as well, so that any combination of claims and the features thereof is disclosed and can be claimed regardless of the dependencies chosen in the attached claims. The subject-matter may include not only the combinations of features as set out in the disclosed embodiments but also any other combination of features from different embodiments. Various features mentioned in the different embodiments can be combined with explicit mentioning of such combination or arrangement in an example embodiment or without any explicit mentioning. Furthermore, any of the embodiments and features described or depicted herein may be claimed in a separate claim and/or in any combination with any embodiment or feature described or depicted herein or with any of the features.

Some portions of this description describe the embodiments in terms of algorithms and symbolic representations of operations on information. These operations and algorithmic descriptions, while described functionally, computationally, or logically, are understood to be implemented by computer programs or equivalent electrical circuits, microcode, or the like. Furthermore, it has also proven convenient at times, to refer to these arrangements of operations as engines, without loss of generality. The described operations and their associated engines may be embodied in software, firmware, hardware, or any combinations thereof.

Any of the steps, operations, or processes described herein may be performed or implemented with one or more hardware or software engines, alone or in combination with other devices. In one embodiment, a software engine is implemented with a computer program product comprising a computer readable medium containing computer program code, which can be executed by a computer processor for performing any or all of the steps, operations, or processes described. The term "steps" does not mandate or imply a particular order. For example, while this disclosure may describe a process that includes multiple steps sequentially with arrows present in a flowchart, the steps in the process do not need to be performed by the specific order claimed or described in the disclosure. Some steps may be performed before others even though the other steps are claimed or described first in this disclosure. Likewise, any use of (i), (ii), (iii), etc., or (a), (b), (c), etc. in the specification or in the claims, unless specified, is used to better enumerate items or steps and also does not mandate a particular order.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. In addition, the term "each" used in the specification and claims does not imply that every or all elements in a group need to fit the description associated with the term "each." For example, "each member is associated with element A" does not imply that all members are associated with an element A. Instead, the term "each" only implies that a member (of some of the members), in a singular form, is associated with an element A. In claims, the use of a singular form of a noun may imply at least one element even though a plural form is not used.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights.

What is claimed is:

1. A computer-implemented method of migrating data from a warm-tier data store to a cold-tier data store, the computer-implemented method comprising:
   determining that one or more originally warm snapshots have transitioned to one or more cold snapshots;
   identifying that a plurality of data blocks stored in the warm-tier data store are ready to be transferred to the cold-tier data store due to the one or more originally warm snapshots having transitioned to the one or more cold snapshots, the plurality of data blocks being referenced by the one or more originally warm snapshots, wherein identifying that the plurality of data blocks stored in the warm-tier data store are ready to be transferred to the cold-tier data store comprises:
      determining, for a particular data block, a total reference count of the particular data block,
      determining, for the particular data block, a cold reference count of the particular data block,
      incrementing the cold reference count for each of the originally warm snapshots that reference the particular data block having transitioned to a cold snapshot, and
      determining that the particular data block is ready to be transferred to the cold-tier data store responsive to the cold reference count being equal to the total reference count;
   grouping a subset of data blocks of the plurality of data blocks based on retention periods or expected restoration of the data blocks in the subset; and
   transmitting the subset of data blocks as a unit to the cold-tier data store for storage.

2. The computer-implemented method of claim 1, wherein the unit is a data object for storage in the cold-tier data store.

3. The computer-implemented method of claim 1, wherein determining that one or more originally warm snapshots have transitioned to one or more cold snapshots comprises:
   determining, for a warm snapshot, an amount of time the warm snapshot has been stored;
   comparing the amount of time to a predefined amount of time; and
   based on the comparison, determining that the warm snapshot has transitioned to a cold snapshot if the amount of time is greater than or equal to the predefined amount of time.

4. The computer-implemented method of claim 1, wherein the subset of data blocks of the plurality of data blocks are grouped based on retention periods.

5. The computer-implemented method of claim 1, wherein the total reference count is a total snapshot reference count or a total back reference count.

6. The computer-implemented method of claim 1, further comprising group a second subset of data blocks based on expected restoration for a second plurality of data blocks, and wherein identifying that the second plurality of data blocks stored in the warm-tier data store are ready to be transferred to the cold-tier data store comprises:
   determining, for a particular data block, a total reference count of the particular data block;
   comparing the total reference count of the particular data block to a threshold total reference count; and
   in response to the total reference count of the particular data block being less than or equal to the threshold total reference count, determining that the particular data block is ready to be transferred to the cold-tier data store.

7. The computer-implemented method of claim 6, wherein the total reference count is a total user reference count or client device reference count.

8. The computer-implemented method of claim 1, wherein the subset of data blocks of the plurality of data blocks are grouped based on retention periods, and wherein at least one of the retention periods of at least one of the data blocks in the subset is determined by:
   identifying a list of snapshots referencing the at least one of the data blocks;
   examining a retention requirement for each of the snapshots in the list; and
   determining a maximum retention period of the at least one of the data blocks based on the retention requirement for each of the snapshots in the list.

9. The computer-implemented method of claim 1, wherein grouping the subset of data blocks of the plurality of data blocks based on retention periods comprises:
   sending each of the plurality of data blocks to a candidate queue;
   sorting the data blocks in the candidate queue by the retention periods of the data blocks; and
   selecting some of the data blocks sorted as the subset.

10. The computer-implemented method of claim 9, wherein the selected data blocks in the subset have the retention periods within a threshold range among each other.

11. The computer-implemented method of claim 1, wherein grouping the subset of data blocks of the plurality of data blocks based on expected restoration comprises:
    sending each of the plurality of data blocks to a candidate queue;
    sorting the data blocks in the candidate queue by the expected restoration of the data blocks; and
    selecting some of the data blocks sorted as the subset.

12. The computer-implemented method of claim 11, wherein selecting some of the data blocks comprises:
    selecting data blocks associated with a same user or a same client device.

13. The computer-implemented method of claim 1, further comprising imposing a rule before a data block is migrated from the warm-tier data store to the cold-tier data store, the rule is satisfied when a first expected cost of keeping the data block in the warm-tier data store is higher than a second expected cost, the second expected cost including one or more of the following: an expected cost of writing the data block to the cold-tier data store, an expected cost of maintaining the data block in the cold-tier data store, or an expected cost of restoring the data block from the cold-tier data store.

14. The computer-implemented method of claim 1, wherein the originally warm snapshots are captured as snapshots stored in a deduplicated data system that receives the snapshots from a plurality of users.

15. A system comprising:
    one or more processors; and
    one or more computer readable media coupled to the one or more processors, the computer readable media storing computer code comprising instructions, the instructions, when executed by the one or more processors, cause the one or more processors to:
       determine that one or more originally warm snapshots have transitioned to one or more cold snapshots;
       identify that a plurality of data blocks stored in a warm-tier data store are ready to be transferred to a cold-tier data store due to the one or more originally warm snapshots having transitioned to the one or more cold snapshots, the plurality of data blocks being referenced by the one or more originally warm snapshots, wherein the instruction to identify that the plurality of data blocks stored in the warm-tier data store are ready to be transferred to the cold-tier data store comprises instructions to:
- determine, for a particular data block, a total reference count of the particular data block,
- determine, for the particular data block, a cold reference count of the particular data block,
- increment the cold reference count for each of the originally warm snapshots that reference the particular data block having transitioned to a cold snapshot, and
- determine that the particular data block is ready to be transferred to the cold-tier data store responsive to the cold reference count being equal to the total reference count;

group a subset of data blocks of the plurality of data blocks based on retention periods or expected restoration of the data blocks in the subset; and transmit the subset of data blocks as a unit to the cold-tier data store for storage.

16. The system of claim 15, wherein the subset of data blocks of the plurality of data blocks are grouped based on retention periods.

17. The system of claim 15, wherein the total reference count is a total snapshot reference count or a total back reference count.

18. The system of claim 15, wherein the instructions further comprise instructions to group a second subset of data blocks based on expected restoration for a second plurality of data blocks, and wherein the instruction to identify that the second plurality of data blocks stored in the warm-tier data store are ready to be transferred to the cold-tier data store comprises instructions to:
- determine, for a particular data block, a total reference count of the particular data block;
- compare the total reference count of the particular data block to a threshold total reference count; and
- in response to the total reference count of the particular data block being less than or equal to the threshold total reference count, determine that the particular data block is ready to be transferred to the cold-tier data store.

19. The system of claim 18, wherein the total reference count is a total user reference count or client device reference count.

20. The system of claim 15, wherein the instructions to group the subset of data blocks of the plurality of data blocks based on retention periods comprises instructions to:
- send each of the plurality of data blocks to a candidate queue;
- sort the data blocks in the candidate queue by the retention periods of the data blocks; and
- select some of the data blocks sorted as the subset.

21. The system of claim 15, wherein the instructions to group the subset of data blocks of the plurality of data blocks based on expected restoration comprises instructions to:
- send each of the plurality of data blocks to a candidate queue;
- sort the data blocks in the candidate queue by the expected restoration of the data blocks; and
- select some of the data blocks sorted as the subset.

22. The system of claim 21, wherein the instructions to select some of the data blocks comprises instructions to:
- select data blocks associated with a same user or a same client device.

* * * * *